United States Patent [19]
Holland et al.

[11] Patent Number: 5,177,766
[45] Date of Patent: Jan. 5, 1993

[54] DIGITAL CLOCK TIMING GENERATION IN A SPREAD-SPECTRUM DIGITAL COMMUNICATION SYSTEM

[75] Inventors: Bruce M. Holland, Boulder; Gary L. Bliss, Westminster, both of Colo.

[73] Assignee: Spectralink Corporation, Boulder, Colo.

[21] Appl. No.: 709,600

[22] Filed: Jun. 3, 1991

[51] Int. Cl.$^5$ .............................................. H04L 27/30
[52] U.S. Cl. .......................................... 375/1; 380/34
[58] Field of Search ..................... 375/110, 113–115, 375/119, 120

[56] References Cited
U.S. PATENT DOCUMENTS

| | | | |
|---|---|---|---|
| 4,017,798 | 4/1977 | Gordy et al. | 375/1 |
| 4,383,322 | 5/1983 | Halpern et al. | 375/1 |
| 4,918,707 | 4/1990 | Yoshihara | 375/1 |
| 5,093,841 | 3/1992 | Vancraeynest | 375/1 |

*Primary Examiner*—Bernarr E. Gregory
*Attorney, Agent, or Firm*—Dorr, Carson, Sloan & Peterson

[57] ABSTRACT

A unique method and system is disclosed for generating digital clock timing in a receiver for use in direct-sequence spread-spectrum digital communication systems wherein spread data is delivered from a transmitter to a receiver. The present invention provides at the transmitter frames of digital communication data with each frame having a plurality of time slots and with each time slot having a plurality of digital bits. The transmitter utilizes direct-sequence spreading codes for spreading the digital bits in the time frame. The direct sequence spreading codes each have the same fixed sequence length of M chips and, furthermore, the number of chips per bit CB to spread each digital bit is constant and fully aligned with each digital bit. The ration of M:CB is an integer and the ratio of time of each time slot to the time of the M chips also equals an integer. The spread frames of digital information are despread at the receiver with receiver provided identical direct-sequence codes. The digital clock timing is generated from the receiver's pseudo random sequence generator. Bit timing equals CB*8, nibble timing equals 4*CB, and byte timing equals CB.

20 Claims, 14 Drawing Sheets

DIGITAL CLOCK TIMING GENERATION IN A SPREAD-SPECTRUM DIGITAL COMMUNICATION SYSTEM

BACKGROUND OF THE ART

1. Field of the Invention

The present invention relates to spread-spectrum communication systems and, more particularly, to the recovery of the digital clock timing by the receiver in spread-spectrum digital communication systems.

2. Statement of the Problem

In digital communication systems in general, the recovery of timing is difficult and usually significantly contributes to the overhead of the operating system. In spread spectrum systems, the maximal sequence length is $2^n-1$ chips; for $n=7$, the maximal length is 127 chips. In nonsynchronous digital systems for example, the provision of start and stop bits can be utilized to provide the necessary bit and byte timing information. The use of such start/stop bits, however, adds to the overhead and reduces the bandwidth of the transmitted digital data. In other approaches, the clock is encoded with the data stream or the clock is related to the carrier frequency that is transmitted.

Word synch is conventionally generated by sending a specific pattern of data bits called "word synch" that signals the start of the data field. The longer the pattern of data bits, the more accurate the detection of the word clock and the less likely it is to find a false synch location. The provision of a long word synch contributes significantly to the overhead of a time slot.

One conventional approach to clock extraction is to use a synchronous method to extract the clock from the carrier signal. Synchronous methods require generally complex circuits including carrier multipliers and phase lock loops in order to function. Such hardware can be expensive and relatively slow in operation. For example, phase lock loops require time to lock on to the correct phase. In TDMA or TDD systems this means adding a longer section to the time slot which means more overhead and less bandwidth.

Therefore, conventional methods of bit and word clock extraction suffer from a high degree of complexity. The accuracy of extraction degrades when interference or low signal levels exist. In conventional spread-spectrum digital communication systems, the digital clock timing for the despread digital data is generated from the despread signal. Hence, a receiver first despreads the received signal and then recovers digital clock timing from the despread signal. The circuitry for despreading and clock recovery are separate and costly.

A need exists, especially in portable telephony environments, to obtain digital clock timing for the despread digital data from the receiver's despreader in order to reduce the cost and complexity of the receiver. Hence, a need exists to generate digital timing inexpensively with low overhead in the time slot.

3. Solution to the Problem

The present invention provides a solution to the above problem by providing a spread-spectrum digital communication system in which the recovery of the bit clock, the nibble clock, and/or the byte clock are derived from the pseudo random sequence generator at the receiver. Expensive circuitry for recovery of digital timing from the despread digital data is not required. This is accomplished by adding a chip to the conventional $2^n-1$ pseudo random sequence used to spread and despread the digital data. For example, where $n=7$, $127+1=128$ chips are used for the sequence. The pseudo random signal generator is designed so that when the number of chips per bit used to spread the digital information at the transmitter is divided into the number of chips in the sequence length an integer value results. The time slots of digital information contained in each transmitted frame are spread wherein a fixed number of chips per bit is provided and wherein the chips per bit are aligned with each bit of digital information. Furthermore, the time for the sequence length of M bits when divided into the time for a time slot also results in an integer value. At the receiver, the clock which drives the pseudo random signal generator is also utilized to provide the digital timing for the despread digital information. Hence, the present invention provides a solution to the above problem by aligning the chips of the spreading sequence with the digital bits of the spread data and by meeting the above integer criteria.

SUMMARY OF THE INVENTION

The present invention provides a unique method and system for generating digital clock timing in a receiver for use in direct-sequence spread-spectrum digital communication systems wherein spread data is delivered from a transmitter to a receiver.

The present invention provides at the transmitter frames of digital communication data with each frame having a plurality of time slots and with each time slot having a plurality of digital bits. The transmitter utilizes direct-sequence spreading codes for spreading the digital bits in the time frame. The direct sequence spreading codes each have the same fixed sequence length of M chips and, furthermore, the number of chips CB per bit to spread each digital bit is constant and fully aligned with each digital bit. The ratio of M:CB is an integer and the ratio of time of each time slot to the time of the M chips also equals an integer. The spread frames of digital information are despread at the receiver with receiver provided identical direct-sequence codes. The digital clock timing is generated from the receiver's pseudo random sequence generator. Digital bit timing equals CB, nibble timing equals 4 * CB, and byte timing equals 8 * CB.

DETAILED SPECIFICATION

1. Spreading

Figure 1:
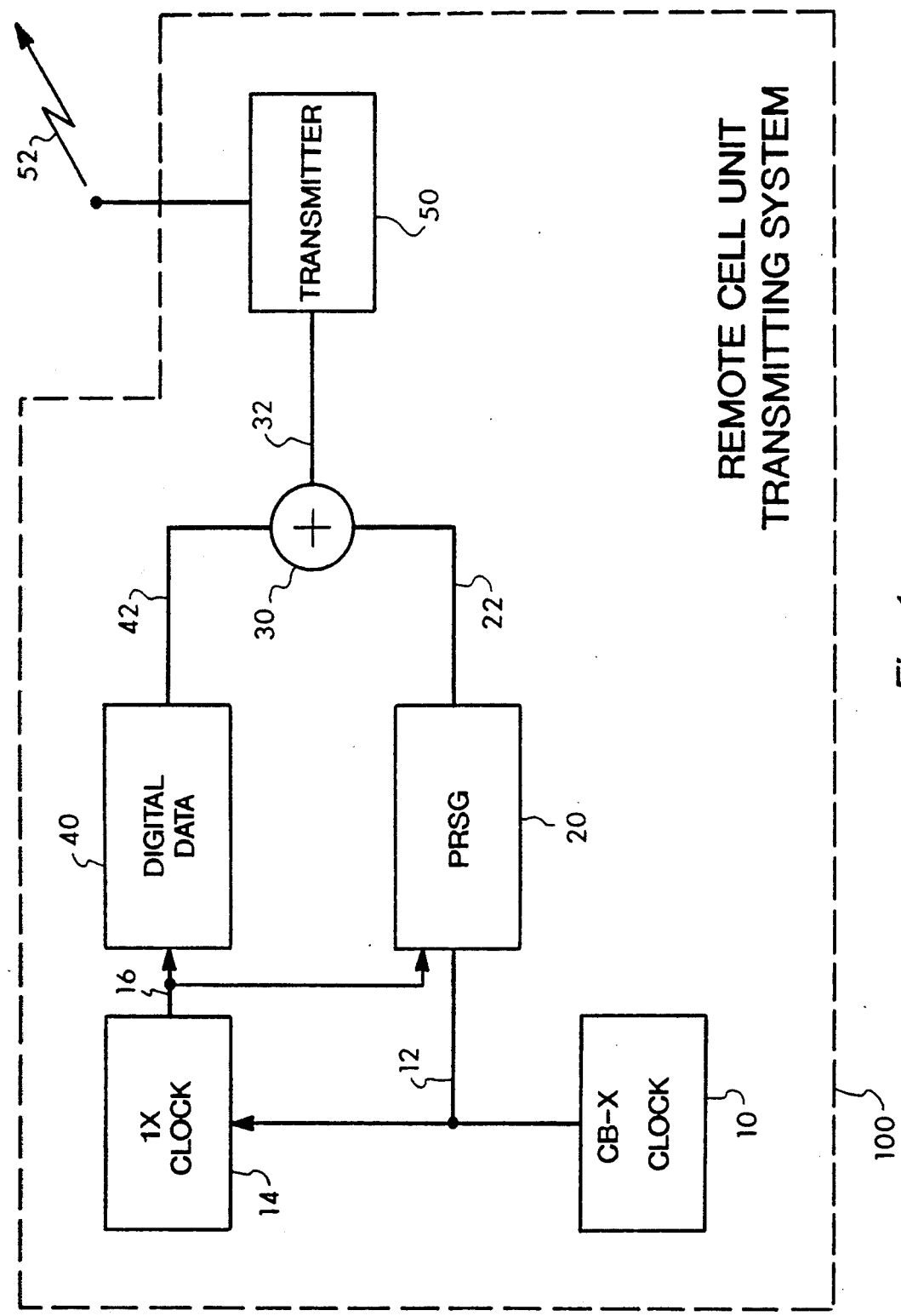
FIG. 1 is a block diagram of the electronic components of the transmitter of the present invention.

In FIG. 1, the transmission by a transmitter system (or a remote cell unit RCU 100) of the direct-sequence spread spectrum carrying time division duplex (TDD) or time division multiple access (TDMA) digital information is shown. A conventional CB-X clock 10 drives a pseudo random sequence generator (PRSG) 20 and a 1X clock 14 over lines 12. In the preferred embodiment, the clock (or oscillator) operates at a frequency of 12.288 MHz. The present invention is not limited by the frequency of the clock 10 or by the amount of drift present within clock 10. In fact, the present invention using time frames of 10 milliseconds operates with inexpensive clocks having high drift such as 25 ppm. As will be explained with reference to FIG. 1, the 1X clock 14 provides the bit clock signals over lines 16 to the digital data provider 40 and to the PRSG 20.

The CB-X clock provides timing for the chips of the pseudo random sequence and, in the preferred embodiment, CB=32 chips per bit and clock 10 is a 32X clock. The drift of the clock 10 is relative and based upon a number of factors. For example, the drift of the transmitter clock 10 and the receiver clock is relative to each other—e.g. the receiver may have greater drift than the transmitter or vice-versa. The drift is also a function of the length of the time frame. The shorter the time frame, the greater the drift tolerated. The drift is also a function of the length of the pseudo random sequence. The shorter the length, the greater the drift that can be tolerated. The ensuing invention seeks to use inexpensive clocks with high drifts. However, and as will be further discussed, if the sequence is too long and/or if the time frame is too long, then acquisition will become too long. In the preferred embodiment, a chip sequence of 128 chips, a time frame of 10 milliseconds and a clock drift of 25 ppm is used and provides only one design choice of many.

Figure 2:
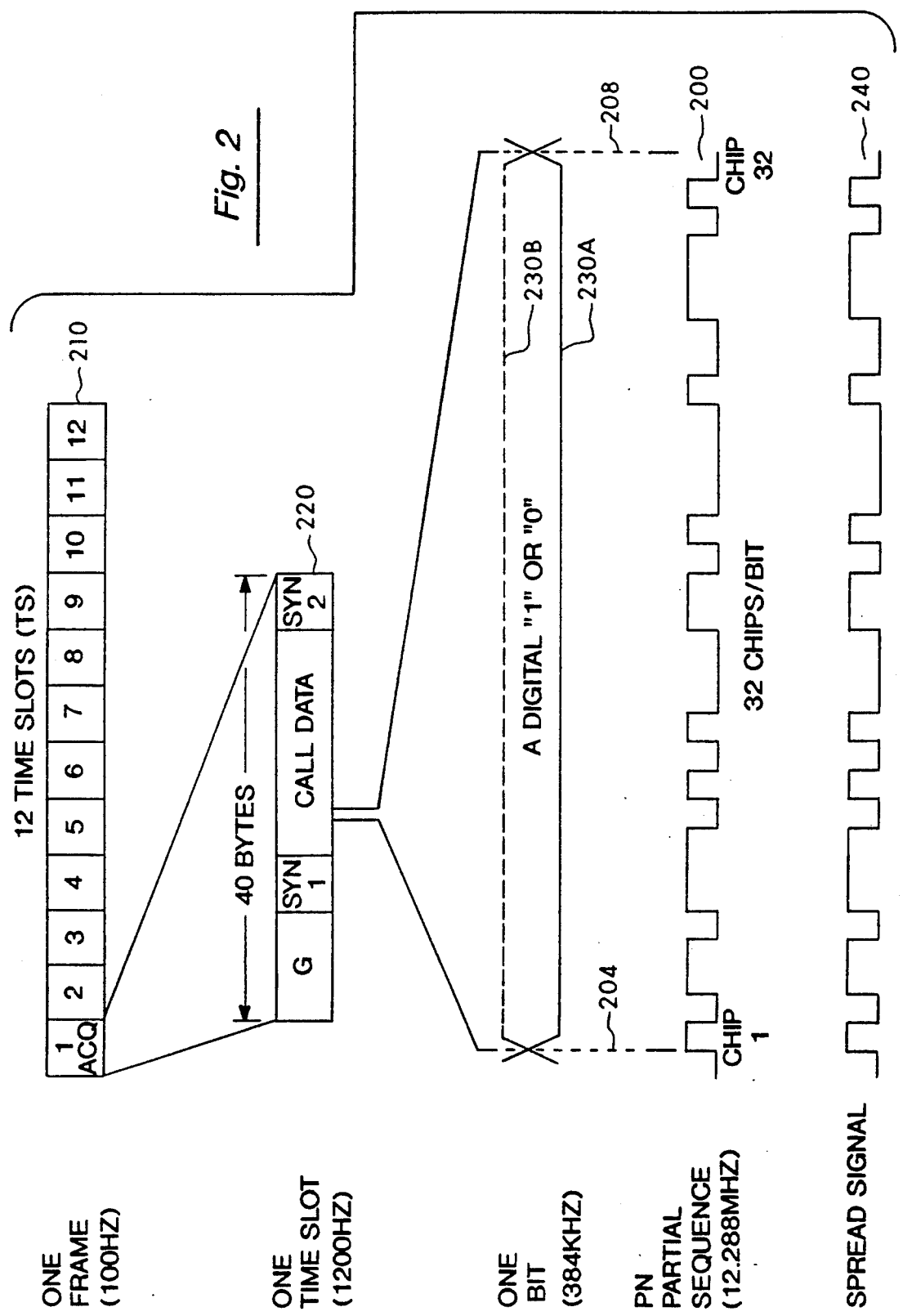
FIG. 2 sets forth the formats for the frame, time slots, and acquisition coded sequence of the present invention.

The PRSG 20 is also conventional and provides the direct-sequence codes to spread the digital information. One code produced by the PRSG generator 20 is an acquisition code. The acquisition code is illustrated in FIG. 2 as a partial sequence 200. The output of generator 20 is delivered over line 22 into a modulo-2 addition circuit 30. TDMA digital data is provided by circuit 40 over lines 42 into the addition circuit 30. It is to be expressly understood that the individual electronic components of the RCU 100 of FIG. 1 are conventional and that a number of different hardware designs could be utilized to spread TDMA digital data by direct-sequence codes under the teachings of the present invention. The assembly of digital data to be spread is well known and may be accomplished by a number of different approaches. The relationships of the chips in the direct-sequence code to the bit timing and the methods of acquisition and tracking are fully explained in the following with reference to a preferred embodiment.

In FIG. 2, the TDD or TDMA data is delivered one frame 210 at a time at a preferred frequency, $f_F$, such as at a 100 Hz rate. Each frame 210 has a predetermined number of time slots, $N_{ts}$, such as twelve time slots, TS1 through TS12. The time slots are delivered at a frequency of $F_{ts} = N_{ts} * f_F$ or 1.2 KHz in the preferred embodiment. The first time slot, as shown at 220, is dedicated for acquisition purposes. Slot 1 of each frame contains fixed and variable digital data spread according to an acquisition code sequence 200.

While the first slot is used in the following discussion, it is to be understood that the acquisition time slot could be located anywhere in the frame. Furthermore, any number or configuration of time slots TS could be provided. In the embodiment shown in FIG. 2, each time slot TS contains forty bytes of formatted information. In the case of the acquisition time slot TS1, the data is formatted as follows:

TABLE I

| | |
|---|---|
| G = | Guard Band (1 byte) |
| H = | Header (6 bytes) |
| SYNC1 = | First Sync (3 bytes) |
| D = | Data (27 bytes) |
| SYNC2 = | Second Sync (3 bytes) |

The G byte is dead time which allows for propagation delays and for turning on and off the receiver and transmitter. The H bytes are used for tracking and will be discussed later. The SYNC1 and SYNC2 bytes are used for acquisition. Each sync field contains a synch word followed by two bytes identifying the beginning or end of the acquisition time slot TS1. The D bytes are used to carry communication data. It is to be expressly understood that the acquisition and tracking features of the present invention are not to be limited by the format of Table I or by the inclusion of the D bytes.

This specific data format 220 for the acquisition of time slot TS1 shown in FIG. 2 is designed for transmission of digital communication data. It is to be expressly understood that a frame 210 may be configured with any number of time slots, $N_{ts}$. Each time slot 220 can have any number of bytes, $N_{bytes}$, and can be suitably formatted with any arrangement of digital data necessary for a specific application. Each time slot has a predetermined number of bits, $B_{ts}$. This invention, therefore, is not to be limited to the data format 220 of FIG. 2. The drawings herein are for a preferred system embodiment and serve to illustrate the operation of the present invention.

One bit of data in time slot 220 is shown at 230. With reference back to FIG. 1, each bit of data on line 42 is delivered into the adder 30 where it is combined with the direct-sequence acquisition code 200 to output on line 32 the spread TDMA digital signal shown in FIG. 2 at 240 which is spread transmitted by transmitter 50 over airwaves 52. In FIG. 2, a solid curve 230A represents a digital "zero" whereas the dashed curve 230B represents a digital "one." The transmitted signal 240 corresponds to the digital "zero" bit 230A, whereas the inverse of curve 240 would correspond to a transmitted digital "one" bit 230B.

The frames 210 are repeatedly delivered at a 100 Hz rate in bursts. Each time slot 230 is delivered at a frequency of $f_{ts} = 1.2$ KHz. Hence, the acquisition time slot TS1 is repeatedly delivered in each frame of the transmission. Each digital bit 230 is delivered at a frequency of $f_{bit} = 8 * N_{bytes} * f_{ts}$ or at a 384 KHz rate (8 * 40 * 1.2 KHz) in the preferred embodiment.

The direct-sequence acquisition code is designed to have a fixed number of chips precisely aligned and synchronized with each digital bit. $N_{chips/bit}$, which in the preferred embodiment, is 32 chips per digital bit as provided by line 16 from the 1X clock. This is clearly shown in FIG. 2 with the initial chip (i.e., chip 1) commencing with the start of the bit 230 as shown by line 204 and with the final chip (i.e., chip 32) terminating with the bit 230 as shown by line 208). Any suitable chip rate per bit more or less than 32, could also be utilized under the teachings of the present invention. When 32 chips per bit (i.e., CB=32) are utilized, then the transmitted data would be a spread-spectrum signal of 12.28 MHz or $f_{chips} = CB * f_{bit}$. The acquisition spreading code 200 is M chips long (M=128 chips in the preferred embodiment). Therefore, in the acquisition time slot TS1, the spreading code is repeated precisely 80 times (i.e., 8 bits×40 bytes=320 bits/time slot; 320 bits/time slot×32 chips/bit=10,240 chips/time slot; 10,240 chips/time slot÷128 chips/sequence=80 sequences/time slot). This can be expressed as $B_{ts} * CBM$ which has an integer value under the teachings of this invention.

In summary, each frame 210 of digital information carries the acquisition time slot which in turn provides digital acquisition information spread by an acquisition code sequence continually repeating within the acquisition time slot. It is to be expressly understood that the chip length of the coded sequence can be more or less than $N_{chips} = 128$ chips and that the teachings of this invention are not to be limited by the chip length of the repeating acquisition code. Furthermore, more or less than 32 chips per bit CB could be utilized. The ratio between $N_{CHIPS}$ and CB will be discussed in the section on digital timing.

Only the acquisition time slot TS1 is spread by the direct-sequence acquisition code, the remaining time slots TS2-TS12 contain communication digital data and are spread by the same or by different direct-sequence communication codes depending upon system implementation. All spreading codes are M chips in length and have the same CB value. The teachings of the present invention are not limited by the specific combination of direct-access pseudo random sequence codes used to spread the digital information.

2. Receiving System

Figure 3:
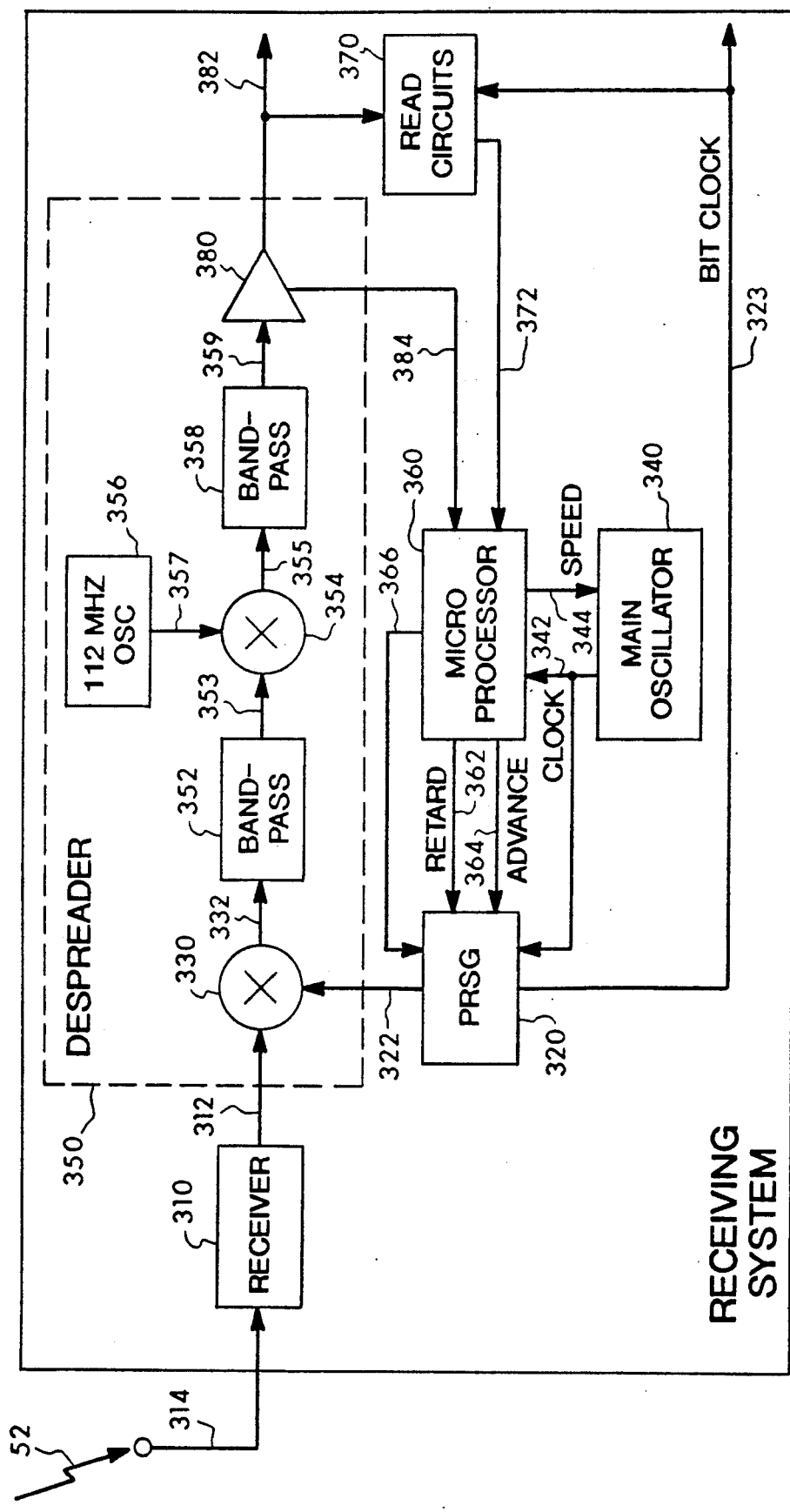
FIG. 3 sets forth the block diagram components of the receiver of the present invention.

In FIG. 3, a remotely located portable telephone PT 300 contains a receiver 310, a pseudo random sequence generator (PRSG) 320, a mixer 330, a clock 340, a despreader 350, a microprocessor 360, and a read circuit 370. FIG. 3 sets forth a design for "despreading" received TDMA data. Only a portion of the circuitry necessary to implement the present invention is shown, the remaining circuitry needed to operate the portable telephone 300 is not shown.

With reference to FIG. 2, the transmitted spread data 52 is received by receiver 310 and delivered over lines 312 into a mixer 330 of despreader 350. Mixer 330 receives the direct-sequence acquisition code over lines 322 from the PRSG 320 and despreads the time division duplex data 230 on lines 312 from the transmitted data and delivers a 122 MHz DPSK encoded signal (i.e., a despread RF signal carrying the despread digital data) as shown by curve 230 on lines 332. The delivered direct-sequence acquisition code is identical to the acquisition code used to spread the digital content of the acquisition time slot.

In the preferred embodiment, the despread RF signal on lines 332 is delivered into a first bandpass circuit 352 which has a bandpass range of 750 KHz and a center frequency of 122 MHz. The output 353 of bandpass circuit 352 is delivered into a mixer 354 which is mixed which a 112 MHz signal from oscillator 356 delivered on line 357. The output 355 of mixer 354 is delivered into a second bandpass filter 358 having a bandpass range of 750 KHz and a center frequency of 10.7 MHz. The output 359 of the second bandpass circuit is delivered into an amplifier 380 which delivers the despread 10.7 MHz DPSK encoded data on lines 382 into the portable telephone 300 for processing. A signal strength output 384 is delivered into the microprocessor 360.

A main oscillator 340 delivers clock signals over line 342 to the microprocessor 360. The main oscillator 340 is accurate within plus or minus twenty-five parts per million. The microprocessor 360 can control the speed of the main oscillator over lines 344. The microprocessor 360 is also connected to the PRSG 320 over lines 362 and 364 which retard and advance, respectively, the PRSG 320 in chip, one-half chip or in one-quarter chip intervals. The individual components of the receiving system 310 are of known design and configuration. The teachings of the present invention are not to be limited by the circuit configuration of FIG. 3.

As will be explained in the following, the circuitry presented in FIG. 3 is utilized first, to acquire the spread transmitted signal 52. Once acquired, the circuitry is used to continually track and to deliver the despread digital data on lines 382 into the portable telephone 300. In this case, the demodulated signal on lines 382 is a 10.7 MHz differential phase shift key (DPSK) signal. The circuitry is used for all three functions of acquisition, tracking, and despreading. The techniques of acquisition and tracking are not limited to the environment of telephony receivers and could find application in any suitable spread spectrum system of communication in which TDMA or TDD data is transferred.

3. Acquisition of the Spread Signal

The acquisition process is divided into two major steps. The first step is called the major acquisition sweep and the second step is termed the refinement sweep. The object of the major acquisition sweep is to align the receiver's PRSG 320 with the transmitted acquisition time slot signal 240. When alignment (i.e., alignment of the receiver's acquisition code with the transmitter's acquisition code) occurs, a maximum signal strength on line 384 results. The object of the refinement sweep is to locate the frame and slot timing boundaries of the transmitted digital data. Each of these steps are discussed in the following.

a. Major Acquisition Sweep

The remote cell unit RCU 100 transmits the acquisition time slot TS1 at the beginning of each frame. Hence, in the preferred embodiment, every 10 milliseconds, the acquisition time slot TS1 is broadcast by the RCU 100. When a portable telephone PT300 awakens, the receiving system 300 is powered and the receiver 310 commences to receive the burst of transmitted frames 210 from the remote cell unit 100 with each frame transmitted every ten milliseconds. The portable telephone 300 must become synchronized with the acquisition code 200 in time slot 1 before output digital data can be delivered on lines 382. Since the portable telephone 300 can awaken at any given time, system 300 simply does not know where the acquisition time slot S1, in time, is. Hence, the pseudo random acquisition sequence of the transmitted signal on line 312 must be interrogated in all possible time slots.

Figure 4:
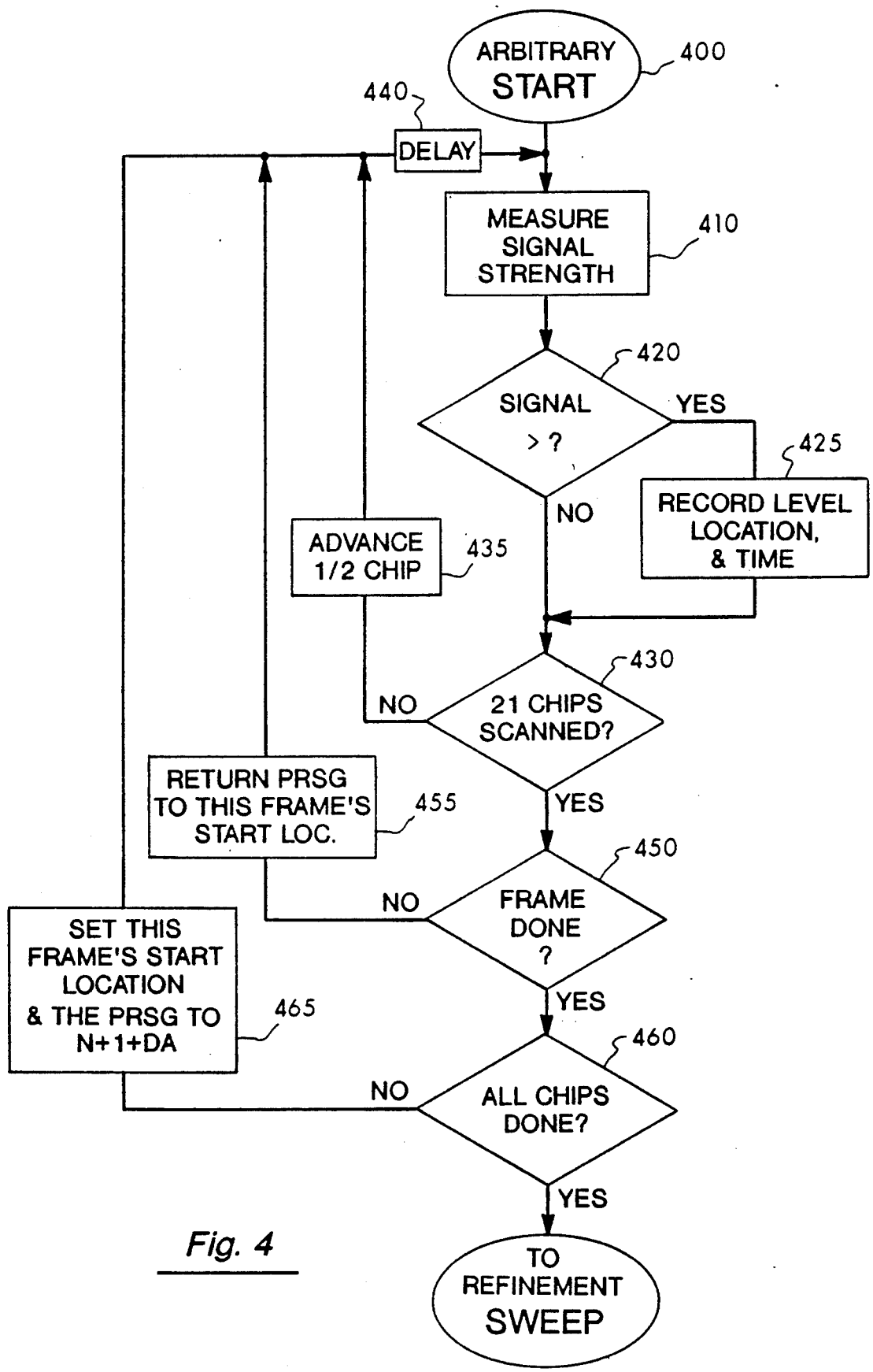
FIG. 4 sets forth the flow chart for the major acquisition sweep of the present invention.
Figure 5:
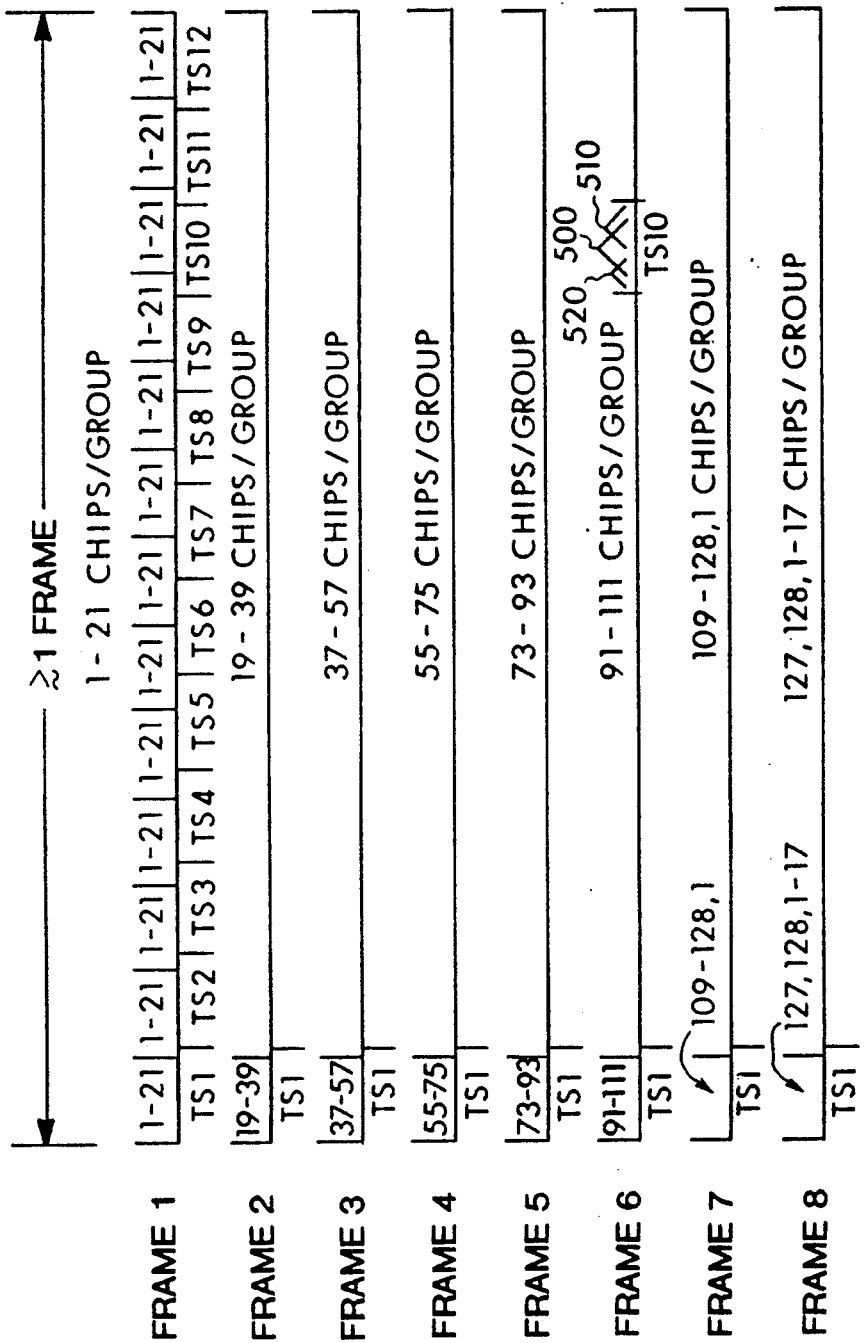
FIG. 5 sets forth the frame by frame analysis performed by the present invention during the major acquisition sweep of FIG. 4.
Figure 6:
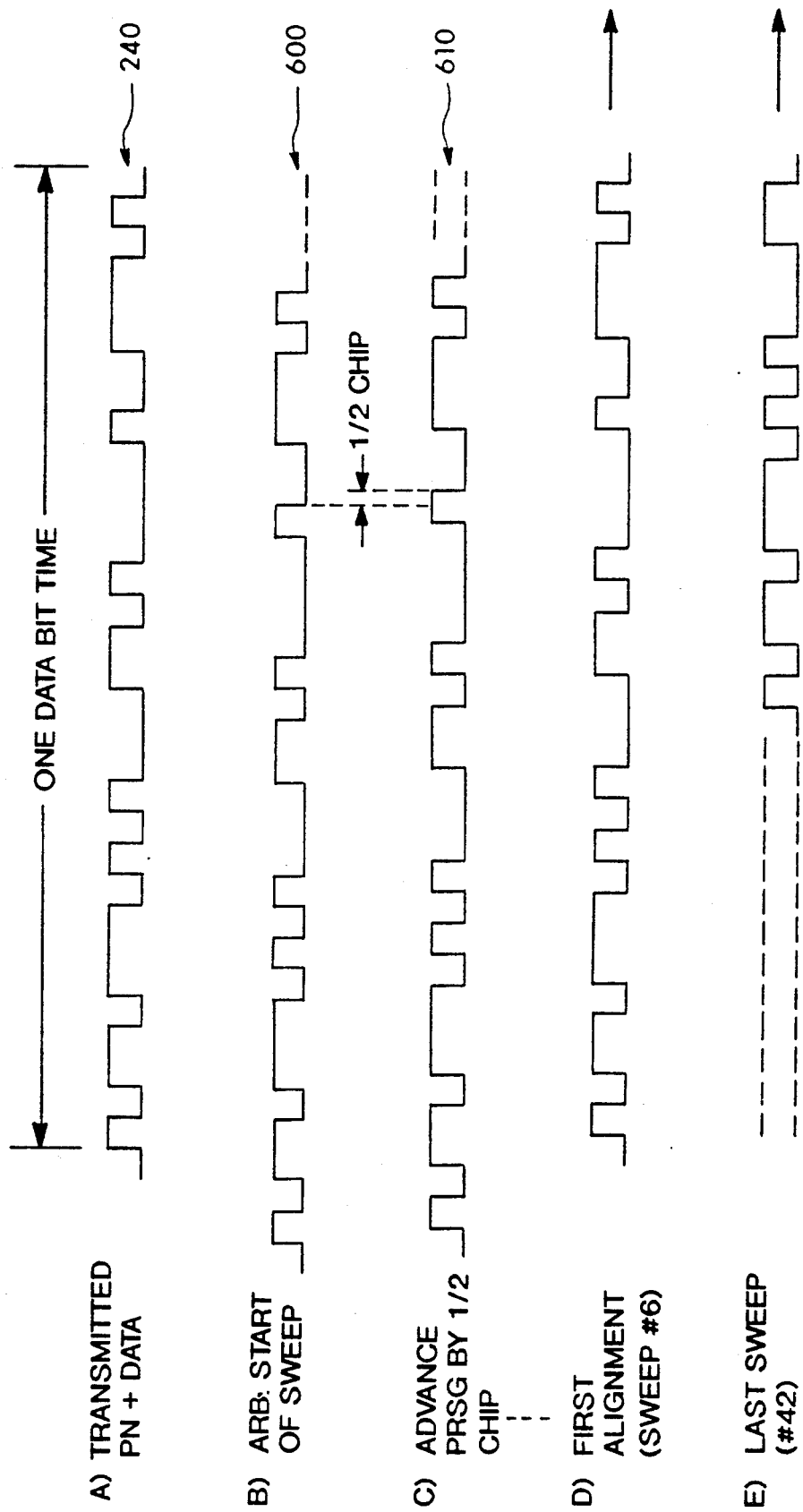
FIG. 6 illustrates the advancement of the pseudo random sequence generator by one-half chip intervals during the active correlation of the major acquisition sweep of FIG. 4.

In FIGS. 4–6, the operation of the major acquisition sweep of the present invention is set forth and is conventionally implemented as software in the microprocessor 360 of FIG. 3. Major acquisition is accomplished by checking all possible alignments of the PRSG 320 against all possible positions of the acquisition slot. In order to minimize the length of time for the major acquisition sweep, the number of chips scanned in a group per frame is maximized. In the preferred embodiment, the number of chips per group scanned is 21 chips and is shown in FIG. 5. It is to be expressly understood that this number could be more or less than 21. The PRSG 320 is incremented in one-half chip increments when scanning so that 42 individual scans are performed. The scanning of all chips in a group must take less than one slot time. If the scanning of the group of 21 chips takes more than one time slot in time to perform, then chips in the acquisition code will be missed. Hence, it is optimum to configure the scanning of the group of 21 chips to occur in a time slightly less than one time slot. Thus, 13 groups of 21 chips are scanned in a frame since 12 time slots are used. This insures that each of 128 chips in the acquisition sequence will be scanned in the major sweep. Likewise, the 13 groups of 21 chip scans will be optimally performed in a time slightly greater than the time of a frame. The 21-chip group scan is repeated until just greater than one time frame elapses and then the next set of 21-chip/groups are evaluated. Of course, the number of groups scanned depends on the number of time slots.

As set forth in FIG. 4, the PT 300 can awaken at any time, and therefore, has an arbitrary start 400. The PRSG 320 of FIG. 3 is at an arbitrary start position 400 and the mixer 330 attempts to despread the signal 240. The signal strength on line 384 of the despread signal is measured by the microprocessor 360 in stage 410. Stage 420 is then entered. At arbitrary start-up 400, no previously recorded signal has been measured, and therefore, the measured signal is greater than the highest previously recorded signal. Stage 425 is entered wherein the measured signal strength is recorded, the one-half chip number is recorded, and the time of the measurement is recorded.

Stage 430 is then entered. Stage 430 determines whether or not a 21-chip group scan has been completed. If not done, stage 435 is entered wherein the PRSG 320 is advanced by one-half chip. This is illustrated in FIG. 6.

In FIG. 6, curve 240 corresponds to the spread signal 240 of FIG. 2. The receiver's direct-sequence acquisition code 600 is delivered by the PRSG 320 into the mixer 330. This is the identical sequence as code 200 of FIG. 2. The acquisition code 600 is not generally aligned with the transmitted signal 240 and, therefore, acquisition cannot occur. As mentioned, upon arbitrary start-up 400, the signal strength that is measured and stored is the result of curve 600 attempting to despread signal 200 in mixer 330. The signal strength sensed by the microprocessor over line 384 is low.

In stage 435, the PRSG 320 is advanced by one-half chip by the microprocessor 360 over lines 364 as shown by curve 610 in FIG. 6 and as illustrated. Stage 440 is then entered which provides a delay. In the preferred embodiment, the delay is 10 microseconds. This time is necessary to allow the PRSG 320 and the other electronic components of the despreader 350 to be adjusted and to settle.

Then stage 410 is reentered and the output signal on line 384 of the despreader based upon using the one-half chip advancement of the receiver's acquisition sequence 610 as compared with the transmitted signal 200 is again measured. In stage 420 if this signal has a greater signal strength than the prior measurement, then stage 425 is entered. If not, then stage 430 is entered and, if not yet done, the PRSG 320 is advanced by one-half chip in stage 435. Again, stage 440 provides a delay and this process continues as shown in FIG. 6 sequentially advancing in time the acquisition sequence as generated by the PRSG by one-half chip intervals. The goal being to precisely change the PRSG in order to align the receiver's acquisition code 600 with the acquisition code 200 appearing in signal 240.

FIG. 5 illustrates a frame-by-frame view of the major acquisition sweep of FIG. 4. This is from the viewpoint of receiver 300. In the first frame (frame 1), 546 one-half chip positions are analyzed (i.e., 13 groups of 42 individual one-half chip sweeps). To fully sweep 42 individual one-half chip positions, 756 microseconds are required. Returning to stage 430 of FIG. 4, when the computed maximum number of chips per group is swept (i.e., 21 chips), then stage 450 is entered.

This stage ascertains whether or not a frame, as shown in FIG. 5, is done. If not, stage 455 is entered and the PRSG 320 is returned to the start location for the particular frame of analysis. As shown in FIG. 5, and for the situation of commencing with the arbitrary start in stage 400, only the first time slot has been analyzed and, therefore, the PRSG 320 is returned to the same arbitrary start value for the next group's scan (i.e., chip position = chip 1). The second group of 21 chips are analyzed in the same fashion that the first 21 were analyzed. This process continues until 13 groups of 21 chips are scanned for Frame 1 of FIG. 5.

From a practical point of view, only one of the twelve time slots represents the acquisition slot and since the present invention is not aware of which time slot is the acquisition time slot, each time slot must be analyzed. What is stored in stage 425 is the maximum signal strength value from an evaluation of 21 chips in one-half chip increments in less than a time slot of Frame 1. For each of the 13 scans in frame 1, the PRSG 320 was returned by the microprocessor to precisely the same beginning chip position of chip = 1, which as shown in FIG. 6 for each time slot, would be the position for curve 600.

When the first frame, as shown in FIG. 5, is complete, stage 450 is exited and stage 460 is entered. This stage ascertains whether or not all 128 chips in the acquisition sequence have been examined. At the completion of frame 1, only the first 21 chips in the sequence were scanned. In the preferred embodiment, eight frames are required in the major acquisition sweep. If M equals the number of chips in the acquisition code, and N equals the number of chips swept in less than a time slot, then the major sweep acquisition would be theoretically accomplished in M/N frames (or, in the preferred embodiment, 128/21 = 6.1 time frames). But this is theoretical and does not take into account drift.

In reference to FIG. 5, the eight frames are shown as being necessary to perform the major sweep. In Frame 1, the first 21 chips are examined in 13 separate scans. In Frame 2, chips 19-39/group are analyzed in each of the 13 scans, until finally in Frame 7 where chips 109-128/-group are swept. In Frame 7, chip 1 is also repeated. Finally, in Frame 8, chips 127, 128 and 1-17 are examined. The first observation with respect to this protocol is that a total of 128 full chip sweeps per group are made in 8 frames which is greater than the theoretical value of 6.1 frames. More than 128 chips are scanned (i.e., chip positions 1-17 are scanned twice). Seven frames rather than 6 are required to complete the 128 chips. The reason for this deviation is explained in the following.

Returning to FIG. 4, if in stage 460 all chip sweeps are not done, stage 465 in entered. This involves an important teaching of the present invention. For example, in moving from frame 1 to frame 2 of FIG. 5, stage 465 causes frame 2 to start at a new PRSG chip location which is equal to the prior chip location which was just completed (i.e., chip 21 for completion of Frame 1) so that the starting location for Frame 2 would be N+1 or chip 22, where N=21. The N+1 chip location however assumes that there is no drift between the clocks in the transmitter and in the receiver. This is not usually the case.

Hence, a drift adjustment (DA) factor must be used to adjust the next location of the PRSG 320. The drift adjustment DA factor upon startup is assumed to be a maximum drift adjustment value which is dependent upon the accuracy of the clocks used in the transmitter and receiver for the system. This drift adjustment DA is the number of chip locations that need to be re-scanned at the start of the next frame interval to compensate for drift. The drift adjustment DA factor causes the next scan sequence to start at a different chip position rather than the expected N+1.

In the example of FIG. 5, the DA value was assumed to be a maximum of ±2.5 chips. Therefore the new starting chip location is 19 (i.e., the chip location is rounded down to so that all chips are scanned). The "minus" value indicates that the receiver's clock is faster than the transmitter. The "plus" value indicates that the receiver's clock 340 is slower than the transmitter's clock. Hence, in FIG. 4, the sweep will continue at chip location 19 (i.e., 21+1−2.5).

After delay 440 occurs, the major acquisition sweep flow of FIG. 4 is now repeated for Frame 2 with twenty-one chips, i.e., the 19-39/group, being swept in 13 scans across Frame 2. In exiting Frame 2 through stage 460 then the drift analysis will result in the new start location at chip 37 (i.e., 39+1−2.5) for Frame 3 and this process continues. In moving from Frame 6 to Frame 7, the Frame 7 starting location is chip location 109 and, therefore, the last chip location upon exiting Frame 7 is chip position 1. At this point, all 128 chip positions in the acquisition code have been evaluated in all time slots assuming a DA factor of −2.5. The actual drift relative to the transmitter is unknown. Consequently, both ±DA must be accounted for.

To insure that all chips have been properly evaluated, scanning continues for $F_2$ frames where $F_2 = (DA*F_1/N)$ where:

$$F_1 = M/(N+(-DA)) = 128/(21-2.5) = 6.9$$

$$F_2 = (DA*F_1/N) = (2.5 \div 6.9)/21 = 0.45$$

$$F_{TOTAL} = F_1 + F_2 = 6.9 - 0.45 = 7.35 \text{ frames}$$

Where:

$F_1$ is the number of frames needed to scan for a negative DA, $F_2$ is the number of additional frames to scan for a positive DA, $F_{TOTAL}$ is rounded up to the next integer frame The total acquisition time for the major sweep, under the preferred embodiment, is 8 frames×10 milliseconds/frame or 80 milliseconds to acquire when DA=±2.5 chips. In the example of FIG. 5, the start of each frame compensates for a fast receiver clock and the overscan in frame 8 compensates for a slow receiver clock. After all locations (including those overscanned) are scanned, the major sweep is completed.

Relevant information stored in memory by stage 425 provides the following information for the detected peak:

1. signal strength
2. chip location, and
3. time from start of sweep.

For example, in FIG. 5, assume the peak 500 was determined at chip position 87 in time slot TS10 of Frame 6. Because of the drift in the system, this is an uncertain position since each frame (as counted from the last frame of the major sweep) contributes a drift uncertainty, in the above example, of ±2.5 chips. Hence, for Frame 6, the peak 500 has an uncertainty or staleness of 3×2.5=±7.5 chips. If the peak were found in Frame 8, the uncertainty would be ±2.5 chips. If the peak were found in Frame 1, the uncertainty would be 8 * ±2.5 or ±20 chips.

For acquisition the PRSG 320 has been stepped by the microprocessor to sample the signal strength at all slot positions at a point in time when the transmitted signal is present. At the end of the major sweep, the PRSG 320 is set to the position that produced the greatest signal strength. If the transmitter and receiver clocks were identical and precisely in sync, then the major sweep would be sufficient to acquire the transmitted signal. However, inexpensive clocks are used in the preferred embodiment and drift exists. It can be appreciated that if drift becomes too large, the uncertainty becomes too great and acquisition may not occur. A refinement sweep is necessary to acquire the transmitted signal. The length of the refinement sweep depends upon the magnitude of drift between the transmitter and receiver clocks.

b. Refinement Sweep

The second portion of acquisition is the refinement sweep. The object of the refinement sweep is to locate the frame and slot timing boundaries of the spread signal 52. The peak found in the major acquisition sweep must now be precisely located. The refinement sweep performs two sweeps centered on the location of the largest peak found in the major sweep. This is illustrated in FIG. 7.

Figure 7A:
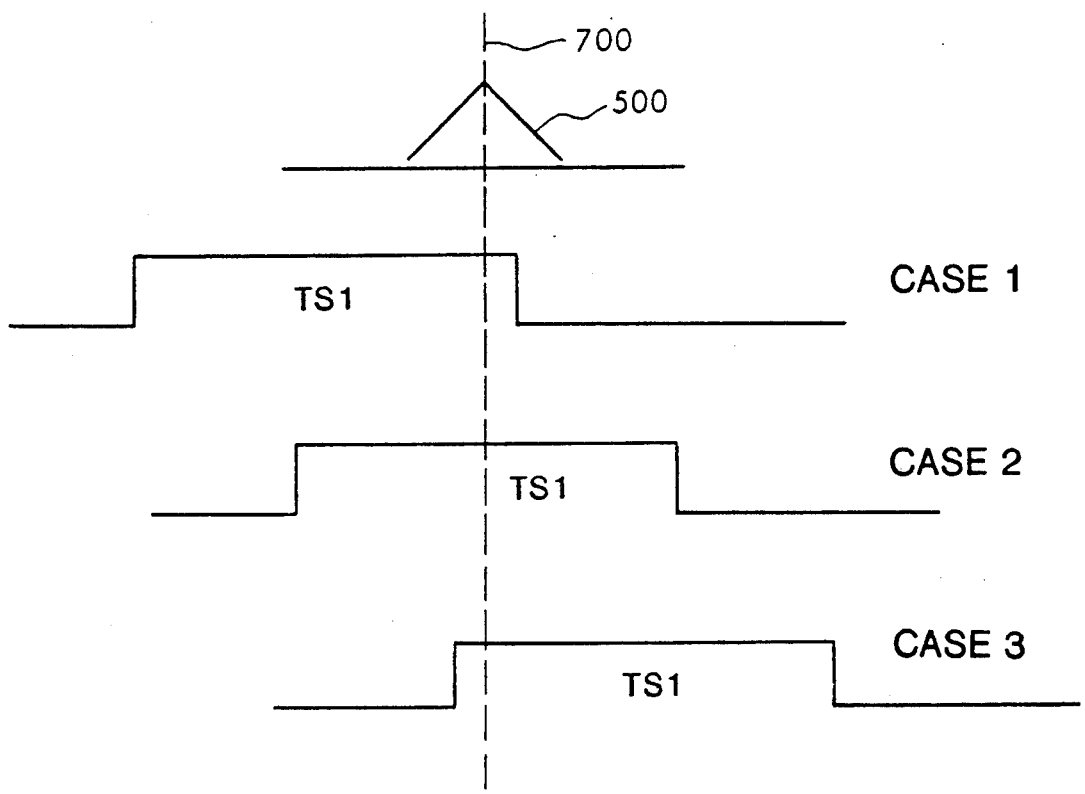
FIGS. 7a-7b illustrate an example of the refinement sweep of the invention.

In FIG. 7a, the peak 500 is located in the major acquisition sweep and is referenced to a time line 700 which corresponds to the maximum potential of peak 500. This location 700 occurs in each time frame (i.e., every 10 milliseconds) which in FIG. 5 occurs in time slot TS10 at about chip 87 of the sequence. Keep in mind that 80 repetitions of the sequence occurs in time slot 10 and that the "time from start of sweep" stored by the microprocessor approximately locates the sequence. The transmitted acquisition time slot TS1 is providing a maximum signal strength in the receiver's time slot TS10 when the PRSG is set to this chip position and time from the start of sweep. With respect to the receiver's time slot 10, the peak 500 could be located near the end of the transmitted acquisition time slot TS1 (case 1), in the middle of the time slot (case 2), or at the beginning of the time slot (case 3). Case 1, case 2, and case 3 represent possible approximate positions with respect to the receiver's time slot; the alignment of which is yet to be determined. Therefore, cases 1 through 3 represent the actual transmitted time slot alignments with the center line 700 of the detected peak 500 by the receiving system 300.

The refinement sweep consists of two phases of operation. Each phase can be two frames in length. The purpose of phase 1 is to remove the staleness of the chip location resulting from the major acquisition sweep. Depending upon how stale the peak location 500 is and how much actual drift exists between the transmitter and receiver clocks, the new peak may be found in one or two frames. The purpose of phase 2 is to use the updated chip and time information from phase 1 in order to find synchronization with the PRSG 320 and to decode a sync word in the transmitted acquisition slot TS1. Each of these phases of operation will be discussed next.

(i) Phase One

Figure 7B:
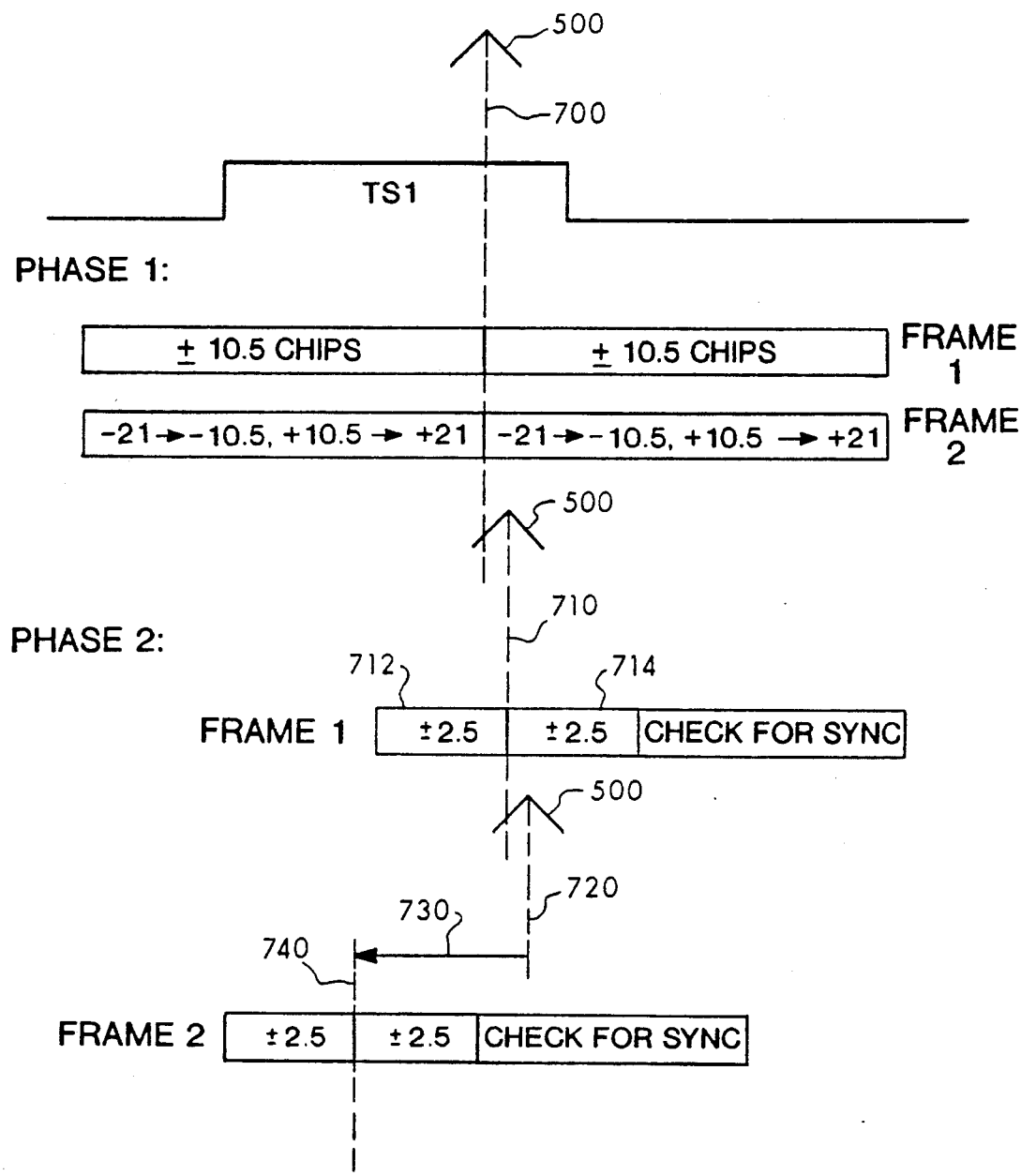

As discussed above, the three possible alignments (cases 1 through 3) exists with respect to the actual acquisition time slot TS1. In the major acquisition sweep, N chips/group (N=21) were scanned in one-half chip positions in less time than one time slot. In order to account for all three cases, two scans of ±10.5 chips (i.e., 21 total chips) are performed on each side of the time line 700 of the detected peak 500 as shown in FIG. 7b. During this scan, the peak signal strength and chip location is again recorded in the same fashion as determined in the major acquisition scan (i.e., scanned in one-half chip intervals and recording the highest signal strength). In the event the computed staleness was greater than 10.5 chips, a second scan (i.e., frame 2) is required. The second scan sweeps chips offset by −21 to −10.5 chips and +10.5 chips to +21 chips. Again, the peak signal strength and chip location is recorded just as it was done for the major acquisition scan. In the above example of approximately locating the peak position at receiver's chip position 87 plus or minus 7.5 chips in the receiver's time slot TS10, only the phase 1, frame 1 scan would be performed.

The purpose of phase 1 is to locate a new center line for the peak within plus or minus 2.5 chips. In FIG. 7b, assume for purposes of illustration that peak 500 has its maximum signal strength located in phase 1 of the refinement sweep at new time line 710. Phase 2 is now entered.

(ii) Phase Two

The peak 500 of the transmitted acquisition time slot is now located to a new time line 710 within plus or minus 2.5 chips in the receiver's time slot. The goal of phase 2 is to precisely define the frame and time slot boundaries by decoding the synch word in the acquisition time slot TS1. Two scans of plus or minus 2.5 chips are performed as shown in FIG. 7b on each side of the time line 710. The first scan in frame 1 of phase 2 relocates peak 500 to a new time line of 720. The uncertainty of the chip position of the peak 500 has now been resolved to a specific one-half chip position as represented by time line 720.

The microprocessor 360 sets the PRSG 320 by selectively advancing 364 or retarding 362 of the PRSG 320 to the location 720. That is, the PRSG 320 is set to the chip location that gives the maximum signal strength for detected peak 500. The microprocessor 360 now enables the hardware read data block 370 to begin reading data and to search for the sync word in the acquisition time slot TS1. The sync word will either be in fields SYNC 1 or in SYNC 2 of the acquisition time slot (see Table I). The microprocessor 360 waits for the sync word to be detected or for one time slot to elapse. If the sync word is detected, the microprocessor reads the next two bytes in the SYNC field. These bytes are fixed and determine if sync was found at the beginning (case 3) or end (case 2) of the time slot. These two remaining bytes are also used for error detection. If the two bytes do not exactly match the starting or ending byte sequence in the acquisition time slot as transmitted, a false sync is declared. If the sync word is read and no error is found, this acquisition is complete.

In the event no sync is detected or if false sync is discovered, a second frame in phase 2 is used. This is illustrated in FIG. 7b as phase 2, frame 2. It is assumed for purposes of illustration that a frame 2, phase 2 scan is necessary since the peak 500 was found to be that of case 1 in that it was near the end of the slot (case 1) such that it failed.

The phase 2, frame 2 scan commences by shifting the time line 720 a predetermined amount such as a predetermined number of bytes earlier in time as indicated by arrow 730 so that a new time line 740 is formed. This allows another scan of ±2.5 chips on each side of the time line 740 to occur which will be completed sooner in the frame so that the word sync will not be missed. If the result of the phase 2, frame 2 scan is still unable to detect a word sync, an error condition exists. The major acquisition sweep will now be repeated from the beginning.

Figure 8A:
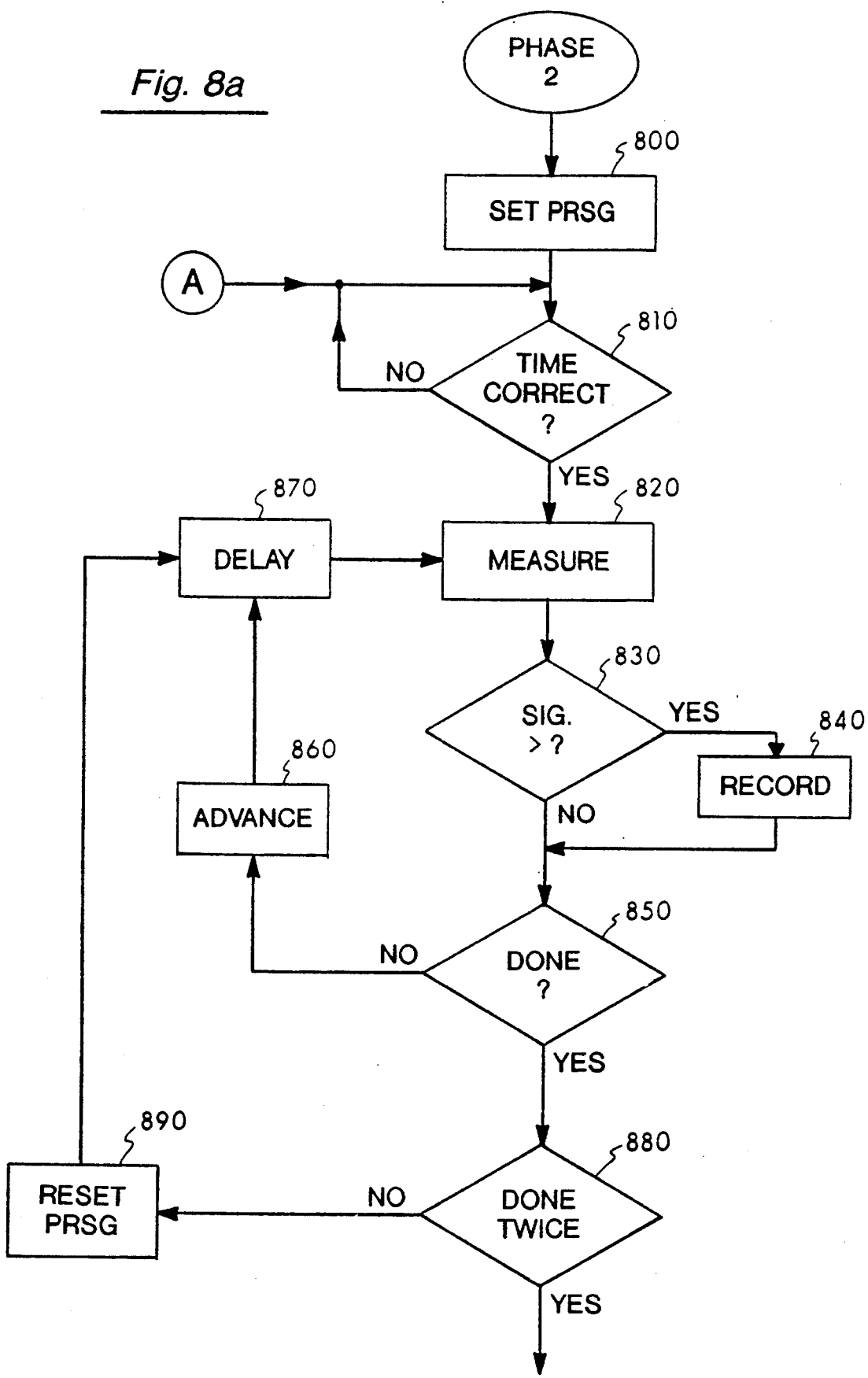
FIGS. 8a-8b set forth the flow chart of the refinement sweep of the present invention.

In FIG. 8, the operation of the software in the microprocessor 360 is detailed. Phase 2 is entered as discussed above. The PRSG 320 is set in stage 800 to correspond to −2.5 chips from the time line 710 as illustrated in FIG. 7b. This corresponds to point 712 of frame 1, phase 2. The signal strength for peak 500 is set to zero. In stage 810, the microprocessor waits for the correct frame time to begin measurements. For phase 2, frame 1, this is timeline 710 less the time it takes to perform a ±2.5 chip scan.

If correct, stage 820 is entered. In stage 820, the signal strength is measured and in stage 830 if the signal strength is greater than previous measurements stage 840 is entered to record the signal strength and if not stage 850 is entered to ascertain whether or not the sweep is done. The sweep requires ±2.5 chips to be swept on either side of time line 720. If the sweep is not done, stage 860 is entered which advances the PRSG 320 by one-half chip which then is delayed in stage 870 to allow the equipment to settle before another measurement in stage 820 occurs. This process is the same as in the major acquisition sweep and continues until the last chip as illustrated by timeline 710 in frame 1 of phase 2 of FIG. 7b is detected at which point stage 880 is entered inquires as to whether or not the ±2.5 chip scan has been performed twice.

Figure 8B:
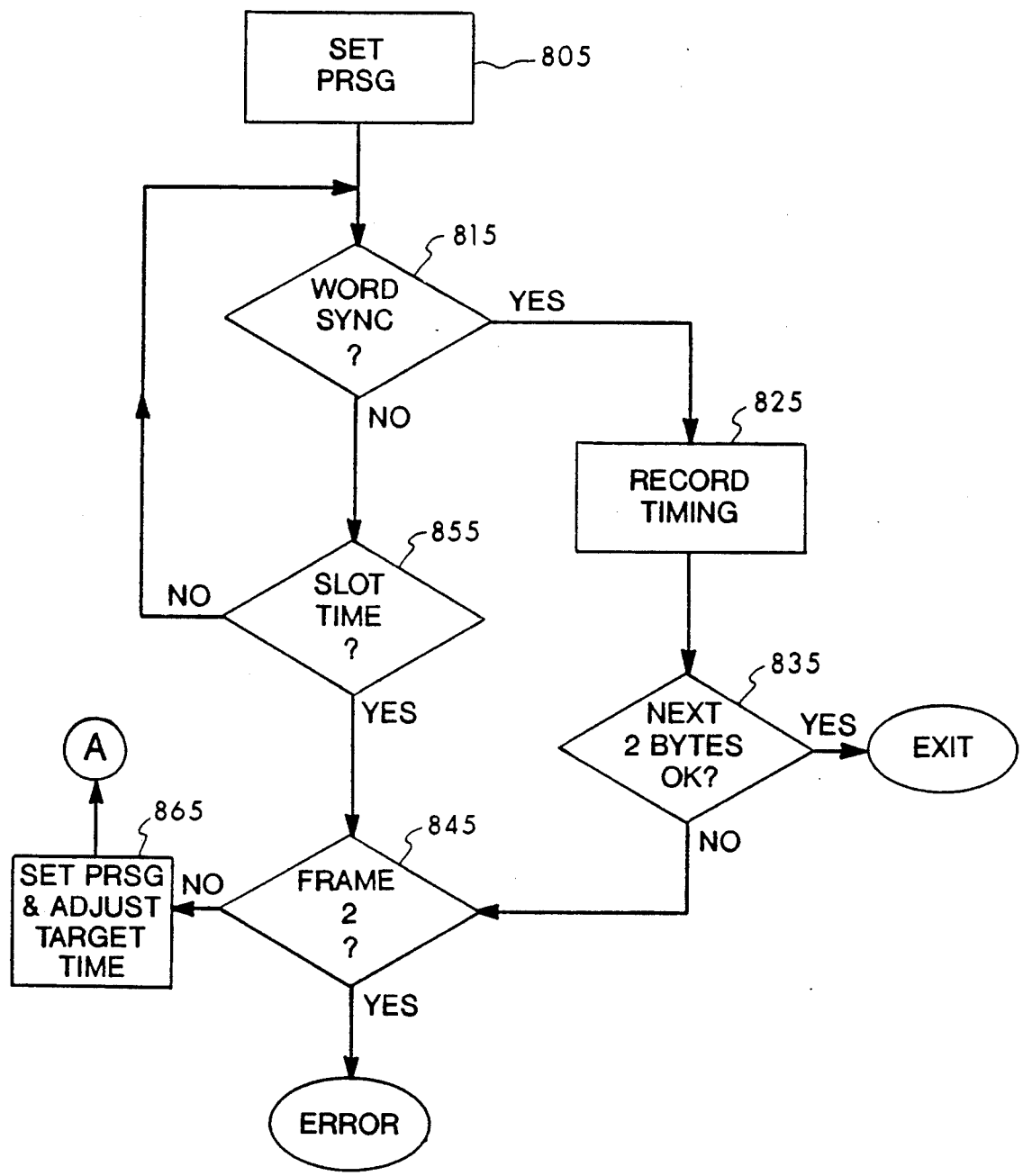

If not, the PRSG is reset in stage 890 to −2.5 chips and the plus and minus 2.5 chip scan after line 710 is performed. If performed twice, then stage 805 of FIG. 8b is entered which causes the PRSG 320 to be set to location recorded in 840. In other words, this is the new time line for the maximum signal strength for the peak 500 as determined in frame 1 of phase 2. In stage 805, the microprocessor 360 enables the read data word circuit 370. Stage 815 is now entered.

In stage 815, the microprocessor over line 372 attempts to read the word sync of the SYNC field in the acquisition time slot TS1 as transmitted and received by the receiver. If a sync word is read (i.e., in either SYNC 1 or SYNC 2), stage 825 is entered to record the timing (i.e., time line 720). In stage 835 the following two bytes in the SYNC field are read. If these two bytes are proper (i.e., no error) then phase 2 is exited having found the time slot and frame boundary timing for the transmitted spread signal. If the next two bytes are not okay, then stage 845 is entered.

Before discussing stage 845, it is important to return to stage 815 and if the word sync was not found, stage 855 is entered which ascertains whether or not the time slot has elapsed. If it has, stage 845 is also entered and if it has not, stage 815 is re-entered. In stage 845, if the second frame scan has already been performed, then an error has been created. On the other hand, if the second frame is not done, then the PRSG is set in stage 865 as discussed earlier. In other words, the peak time 720 is adjusted earlier in time to provide a new time line 740. Stage 810 is entered and frame 2 of phase 2 is now performed.

It can be appreciated that the refinement sweep precisely locates the frame and time slot boundaries. If not, the major acquisition sweep is again performed. In Table I two sync words are utilized to locate the beginning and end of the time slot. It is possible to utilize only one sync word, but to do so would result in a longer refinement sweep.

c. Multiple Transmissions

Figure 9:
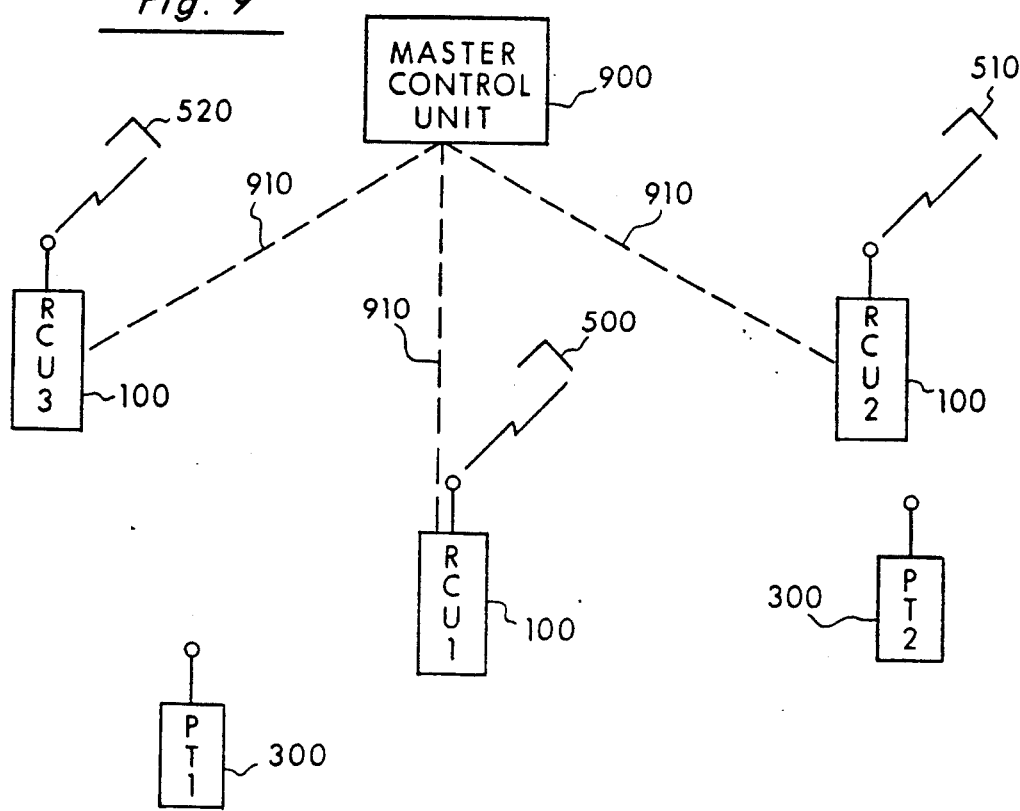
FIG. 9 illustrates the portable telephone of the present invention receiving three transmitted signals.

Because the acquisition process of the present invention detects the maximum signal, in an arrangement of multiple transmitters, a given portable telephone 300 can be receiving the acquisition time slot signals as spread by three separate remote control units 100. This is illustrated in FIG. 9 where a portable telephone 300 receives acquisition time slot signals from three separate RCUs 100 (RCU 1-RCU 3). Each RCU 100 spreads the acquisition time slot TS1 with the same acquisition time slot code 200 of FIG. 2. Each RCU 100 is referenced to a clock from a master control unit 900 and, therefore, each peak is within the same time slot of a frame. However, variations between the circuitry of each RCU 100 and variations in propagation delay cause the individual peaks 500, 510, and 520 to be detected in the major sweep at differing chip locations with the time slot as shown in FIG. 5. For example, peak 510 from transmitter RCU 2 is detected as well as peak 520 from transmitter RCU 3.

The peaks 510 and 520, however, have a lower signal strength and, therefore, the major sweep as shown in FIG. 5 selects peak 500 as having the greatest signal strength. The PT300 selects the RCU of greatest signal strength. In the example of FIG. 9, this is RCU 1.

4. Tracking

The present invention provides a unique method of tracking the communication information in an individual time slot from one frame to the next frame which is based upon both predictive tracking and receiver clock adjustment. A portable telephone 300 upon acquisition of a frame receives communication digital data in one of the remaining time slots assigned to it. The manner of assigning time slots is not material to the present invention and in the following discussion and by way of example, time slot TS2 will be assigned to carry communication data for the receiver 300 of FIG. 3. The digital communication data is spread by a direct-access communication code which is different than the acquisition code.

Predictive tracking ascertains how far the PRSG 320 drifts out of alignment with respect to the spread signal in the communication time slot in one frame time. This misalignment is nearly constant from frame to frame and is the "drift of the receiver." Upon acquisition, the drift must be added to the PRSG location so that there is no misalignment of the PRSG 320 and the spread signal 240. In addition, the oscillator 340 may also be adjusted to either speed up or slow down in order to minimize drift. The purpose of tracking is to more accurately measure the drift and to compensate for any continuing changes between the transmitter and receiver clock signals in order to keep the PRSG synchronized to the transmit signal 240.

The present invention utilizes an electrically controlled tuning capacitor in the main oscillator 340 so as to control the drift rate of the clock signal on line 342 at the receiver in a fashion that it can be adjusted. Zero drift would be optimum for data demodulation by the receiver and is only theoretical in the case of inexpensive oscillators since it is simply not possible to tune such oscillators to achieve zero drift.

Hence, with the goal of using inexpensive oscillators in mind, the present invention tunes the receiver's oscillator to minimize drift to the greatest extent possible and to use predictive tracking to compensate for any remaining or residual drift present. In order to combine or make a hybrid of the two approaches (i.e., "predictively adjusting the PRSG" and "adjusting the oscillator"), the receiver oscillator 340 is tuned so that the residual drift is exactly an increment of the PRSG that can be adjusted. This increment, in the preferred embodiment, is one-quarter chip. The hybrid circuit and method set forth below provides a low cost and simple approach to achieve highly accurate tracking of the spread signal.

In Table II, the communication data format for each of the remaining communication time slots is shown:

TABLE II

| | |
|---|---|
| G = | Guard Band (1 byte) |
| H = | Header (6 bytes) |
| S = | Sync (3 bytes) |
| D = | Data (30 bytes) |

These remaining time slots are spread by direct-sequence communication codes depending upon the system design. In the above example assume that the time slot TS2 carries the communication digital data for the PT of FIG. 3. Tracking can be performed in any time slot including the acquisition slot.

The guard band again functions to let the system 300 components settle. The "header" field H is located after the guard band G in the front of each time slot to provide a time period when the signal is present but no data is being transmitted. The header provides a time period for the adjustment of the PRSG 320 by the microprocessor with no loss of data. Hence, the six header bytes, in the preferred embodiment, constitute tracking overhead which, of course, reduces the amount of data that can be sent in a particular time slot. It is desirable to keep the length of the header as short as possible.

The number of header bytes required is directly related to the amount of drift between the receiver and transmitter clocks. The higher the drift rate between the transmitter and receiver clocks, the more pseudo random sequence acquisition locations must be scanned to reacquire the peak during tracking. It is a goal of the present invention to minimize the number of header bytes and this is accomplished by implementing "predictive" tracking and to control the drift.

(i) Predictive Tracking

Figure 10:
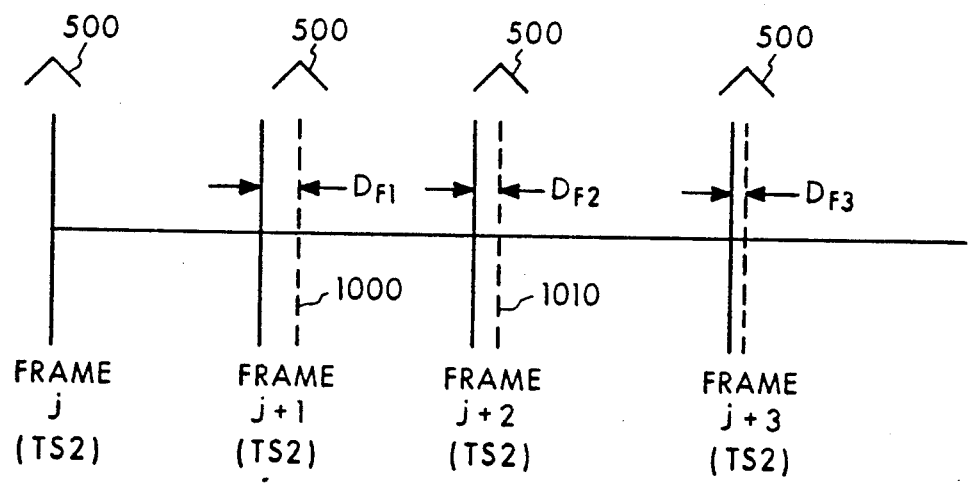
FIG. 10 sets forth the predictive tracking feature of the present invention.

Predictive tracking is defined herein as measuring how far the PRSG 320 is to be adjusted on each successive frame to reacquire the peak and is illustrated in FIG. 10. This drift adjustment factor is termed $D_F$ (frame drift) and is then added (or subtracted) to the PRSG 320 in an effort to locate the PRSG close to the peak 500 prior to starting a scan on the next successive frames. Hence, the adjustment to the PRSG compensates for the inaccuracy between the transmitting and receiving clocks.

Two frames are necessary to calculate the drift adjustment $D_F$. This occurs immediately after acquisition. Hence, for our example, during the time slot TS2 of the first frame after acquisition, the location of the peak is determined by advancing the PRSG in one-quarter chip steps in the same manner as set forth in FIG. 8 for stages 810 through 860. The number of quarter-chip scans required is dependent upon the basic uncorrected oscillator drift over one frame time. This will generally be longer than the time allowed by the minimum sized header, but is less than one slot time. This process is repeated for time slot TS2 of the second frame after acquisition. The difference between the chip location for the two detected peaks (i.e., the peak for the first frame and the peak for the second frame) is the frame drift adjustment, $D_F$. In FIG. 10, the location of peak 500 for frame j is shown. For frame j+1, the peak 500 is located at point 1000 and, therefore, the frame drift is $D_{F1}$. The value of drift is used to adjust the PRSG. For the next frame j+2, the peak 500 is located at a point 1010 which results in a smaller frame drift of $D_{F2}$. Thereafter all predictive scans can be accommodated in the header bytes. This process continues and, while exaggerated in FIG. 10, quickly corrects for the amount of drift between frames. FIG. 10 illustrates the frame adjustment based upon the bytes of time slot TS2 (from frame to frame). This process continues for each successive frame thereby using the prior calculation for the frame drift to set the PRSG location for the next frame. As a result, there is less uncertainty as to the location of peak 500 for the next frame. Hence, the header portion of the time slot format of Table II can be kept to a minimal length.

At least three separate signal strength measurements (i.e., at three one-quarter intervals) are made during the header six bytes of the preferred embodiment. The measurement resulting in the strongest signal strength is used as the location of the peak.

It is to be observed that tracking occurs only during the header bytes of each time slot. Hence, the receiver system 300 stops tracking and then commences to perform data demodulation (i.e., the 30 data bytes). Since no tracking is done during the demodulation of the data, the drift rate between the incoming spread signal 240 and the receiver's oscillator 340 (and other components) must be small enough so that all of the data can be demodulated correctly throughout the entire length of the slot.

Hence, tracking occurs only during a sweep of the header bytes in successive time frames. In the preferred embodiment, a frame is 10 milliseconds long and comprises 12 slots of 40 bytes each. Hence, a frame contains 480 bytes. Hence, tracking occurs in 125 microseconds for each time slot every 10 milliseconds. More or less than three separate scans could be performed during the transmission of the header bytes.

(ii) Clock Adjustment

In addition to predictively setting the PRSG 320 for the next time frame, the present invention also calculates a correction signal based upon the drift adjustment that is sent to the main oscillator 340 in order to cause the clock signal on line 342 to speed up or slow down thus minimizing the magnitude of the error between the receiver's clock 340 and the incoming signal 52. This also minimizes errors that would be created during the demodulation of the data portion of the time slot. It also contributes to configuring the header with the minimum number of bytes.

The PRSG 320 of the present invention locates with the spread signal 52 within one-quarter chip—i.e., the extent of PRSG adjustment. For example, if the drift factor were two chips per frame, then the drift by the end of a time slot would be 2÷12 or one-sixth of a chip. While that value of error in and of itself is less than one-quarter chip PRSG adjustment, it does add to any timing error in the tracking.

The main oscillator 340 must be adjusted to zero drift or as close as possible to zero drift. That is, such that the amount of error in the PRSG 320 is the same at the start of each time slot as is present at the end of each time slot. Hence, tracking is done to one-quarter chip resolution. If the main oscillator is adjusted to minimum drift and the drift is non-zero, an error in initial tracking occurs.

For example, assume that the main oscillator 340 is tuned by microprocessor 360 over line 344 such that the drift is 1.5 quarter chip locations per frame. If in the first frame there is no timing error, the second frame will start with a 0.5 quarter chip error since "predictive" tracking adjusts the PRSG by 1.0 quarter chip. In this case, the oscillator could not be tuned far enough to reach 1.0 quarter chip drift, so is tuned the other direction such that the drift is 2.0 quarter chips per frame. Now the predictive track can be adjusted to fully compensate for the integer number of quarter chips (i.e., 2) per frame. This hybrid tuning approach now allows each time slot to be tracked with a minimum error.

5. Details of PRSG 320

Figure 11:
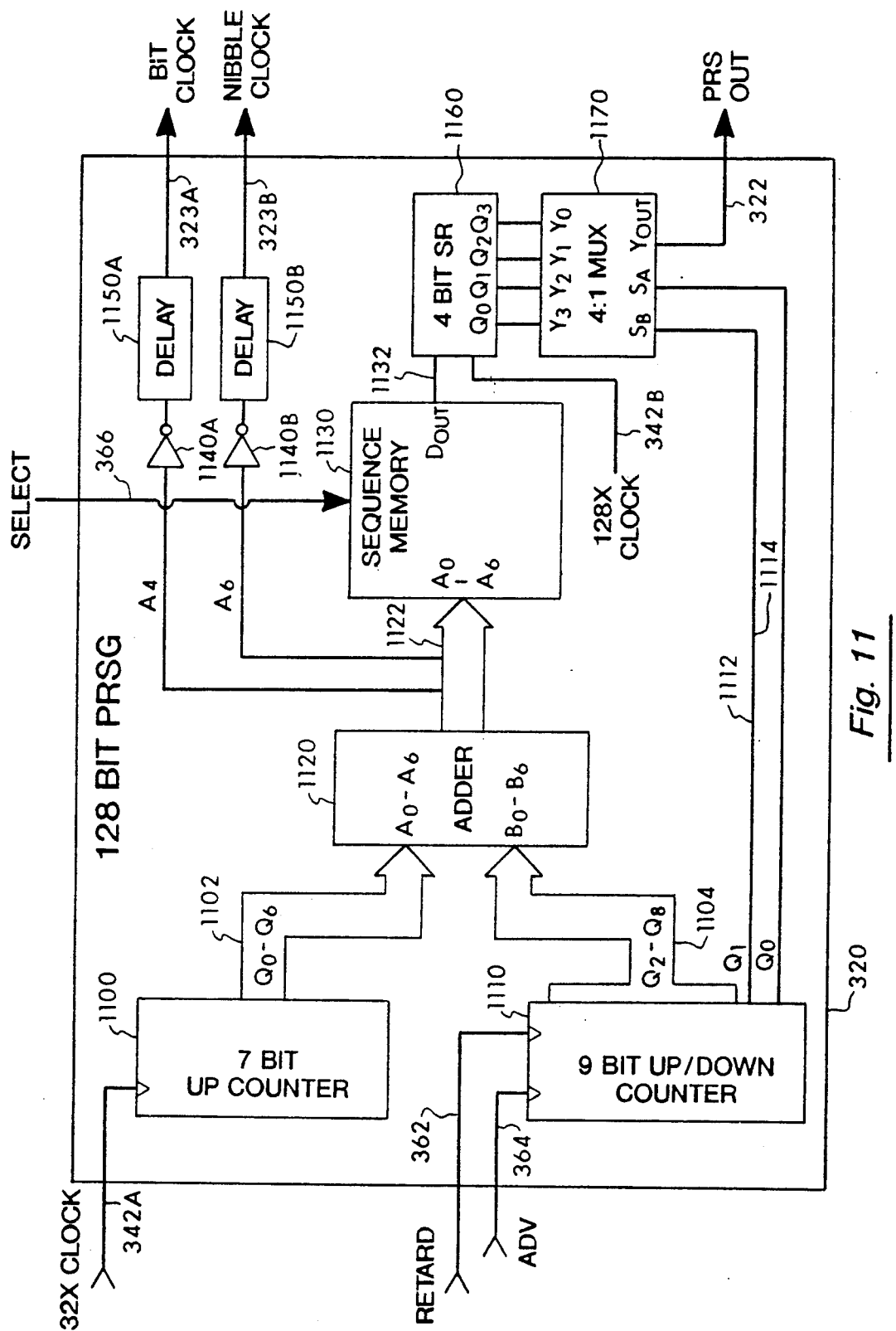
FIG. 11 sets forth the block diagram components of the PRSG of the present invention.

The PRSG 320 is detailed in FIG. 11 to include a seven bit up counter 1100 which receives the 32X clock signals from the main oscillator 340 over line 342A. A corresponding nine bit up/down counter 1110 is interconnected with the retard line 362 and the advance line 364 from the microprocessor 360. An adder 1120 receives the $Q_0$ through $Q_6$ outputs of up counter 1100 over path 1102 and the $Q_2$ through $Q_8$ outputs of the up/down counter 1110 over path 1104. The output of the up counter 1100 is inputted to the adder 1120 as inputs $A_0$ through $A_6$ and the output of the up/down counter 1110 is inputted as $B_0$ through $B_6$. The adder 1120 adds the outputs of the two counters 1100 and 1110 together to provide an output sum on path 1122 which forms the $A_0$ to $A_6$ inputs of the sequence memory 1130.

The output of the sequence memory 1130 is delivered to a four-bit shift register 1160. A 128X clock signal is provided from the main oscillator 340 over line 342B. The four $Q_0$-$Q_3$ outputs of the shift register are delivered into a 4:1 multiplexer 1160. Outputs $Q_0$ and $Q_1$ from the up/down counter 1110 are also inputted into the select lines of the 4:1 multiplexer. Input A4 to the sequence memory 1130 is delivered into an inverter 1140A. The output of inverter 1140A is delivered through delay 1150A and then as the bit clock output on line 323A. As shown, other digital timing clock signals can be easily generated from the PRSG 320. For example, input line A6 can be selected to provide nibble timing. It is to be expressly understood that the components 1100 through 1140 are conventionally available and are of conventional design.

With respect to the operation of retarding and advancing the PRSG 320, it is evident that the microprocessor 360 by sending appropriate signals over lines 362 and 364 can appropriately modify the up/down counter 1110 which when added to the output of the up counter 1100 can advance or retard the chip position of the pseudo random sequence code on lines 322. FIG. 6 illustrates the advancement of the code by one-half increments. The retard 362 and advance 364 signals are delivered over lines 1112 and 1114 to control the 4:1 multiplexer 1170 to provide the one-half chip or one-quarter chip increments.

Likewise, the microprocessor 360 can select which direct-sequence code is to be outputted on lines 322. As mentioned, under the teachings of the present invention, a direct-sequence acquisition code which is stored in memory 1130 is utilized to spread and despread the acquisition time slot. A plurality of other direct-sequence communication codes identical in sequence to those at the transmitter can be selected over lines 366 by the microprocessor 360 to spread and despread selective and/or individual time slots of communication data. The memory may be a read-only-memory or a random access memory. Further, the plurality of codes may be stored in the microprocessor 360 and delivered individually into circuit 1130 in which case circuit 1130 may be a less expensive memory.

In actual communication systems, the PRSG of FIG. 11 resides in both the portable telephone as PRSG 320 and also in the transmitter. Indeed, when the portable telephone communicates with the RCU all of the above discussion applies in that the RCU must also acquire and track a signal spread by a portable telephone. Hence, circuitry set forth in FIGS. 3 and 11 for a portable telephone also exists in the RCU 300.

It is to be expressly understood that variations to the circuit of FIG. 11 could be made without departing from the spirit of the present invention. For example, the up/down counter 1110 could be replaced by a register written directly by the microprocessor 360. In this embodiment, the microprocessor 360 could then calculate the number of chips required to advance or retard the sequence and to write the new value into the register which would then be added to the output of the up counter. Under this design, large movements to new chip positions could be made in one instruction rather than generating a series of pulses to drive the up/down counter 1110. It would also permit the microprocessor 360 to use absolute addressing rather than relative addressing which simplifies the software design.

6. Digital Information Timing

As mentioned, the conventional spreading sequence would have $2^n - 1$ chips or 127 chips when n=7. The present invention adds a chip, 127+1=128, which now allows an alignment with each bit (i.e., 32 chips per bit) and 4 bits per sequence. The conventional sequence length of 127 chips would not correlate.

Figure 12:
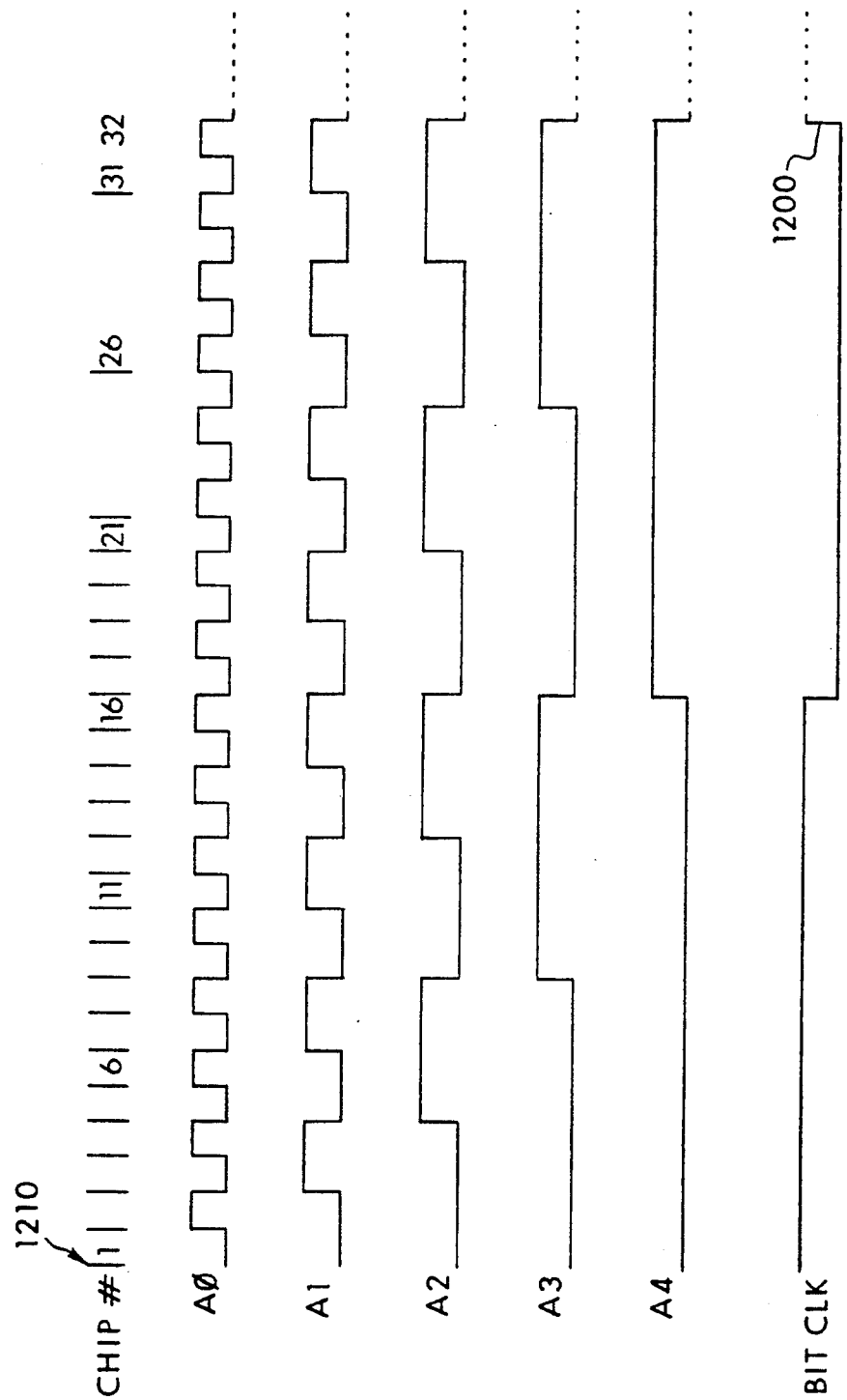
FIG. 12 illustrates the digital timing generation from the chips of the pseudo random sequence.

In FIG. 12, the wave form patterns for the first four inputs (i.e., $A_0$ through $A_4$) which are inputted to the sequence memory 1130 corresponding to the chip positions 1 through 32 are shown. These waveform patterns repeat for chip positions 33 through 64, 65 through 96, and 97 through 128. With reference to FIG. 2, one digital bit of information (i.e., a digital "1" or "0") is precisely aligned, in time, to 32 chips of the partial sequence. The 32 chip sequence is shown in FIG. 12 with respect to the bit clock output on line 323A. The bit clock is high during chip positions 1 through 16 and low during chip positions 17 through 32. Hence, the output on line 323A is the bit clock for the digital information being spread under the teachings of the present invention. The signal on line 323A is inverted from the true value of A4 so as to provide the normal clock rising edge 1200 at the end of the bit period of 32 bits.

The delay 1150 is provided so as to match the delay caused by despreading the data from the mixer 330 to the delivery on line 382. Hence, the delay 1150 enables the bit clock to be properly aligned with the despread data on line 382. Again the delay may be of any suitable design for delaying clock pulses.

In general, bit clock generation is inexpensively provided under the teachings of the present invention by requiring that the length of the pseudo random sequence, M to be equal to $2^n$, where $n$=integer. This adds a bit to the conventionally generated sequences based upon a maximal sequence length of $2^n - 1$. When M is divided by the number of chips per digital bit, CB, the result is equal an integer:

Integer = M/CB

In our example, as clearly shown in FIG. 2, CB equals 32 and the length of the sequence equals 128 chips. Hence, the integer equals 4.

Furthermore, the transmitter 100 and the receiver 300 must use the same starting point (i.e., point 1210 in FIG. 12) for a bit 230 in a pseudo random sequence 200. When this occurs, then an additional digital bit 200 are generated every CB chips (in the preferred embodiment of CB=32). The precise alignment of CB with a bit is shown and is discussed with respect to FIG. 2.

As mentioned in the discussion of FIG. 2, the direct-sequence code is M bits long and occurs a fixed number of times in a time slot (80 times when M=128 chips and CB=32 chips/bit for the 40 byte time slot of FIG. 2). Hence, the ratio $B_{ts}$ * CB/M is also an integer (i.e., 80), in the preferred embodiment.

Figure 13:
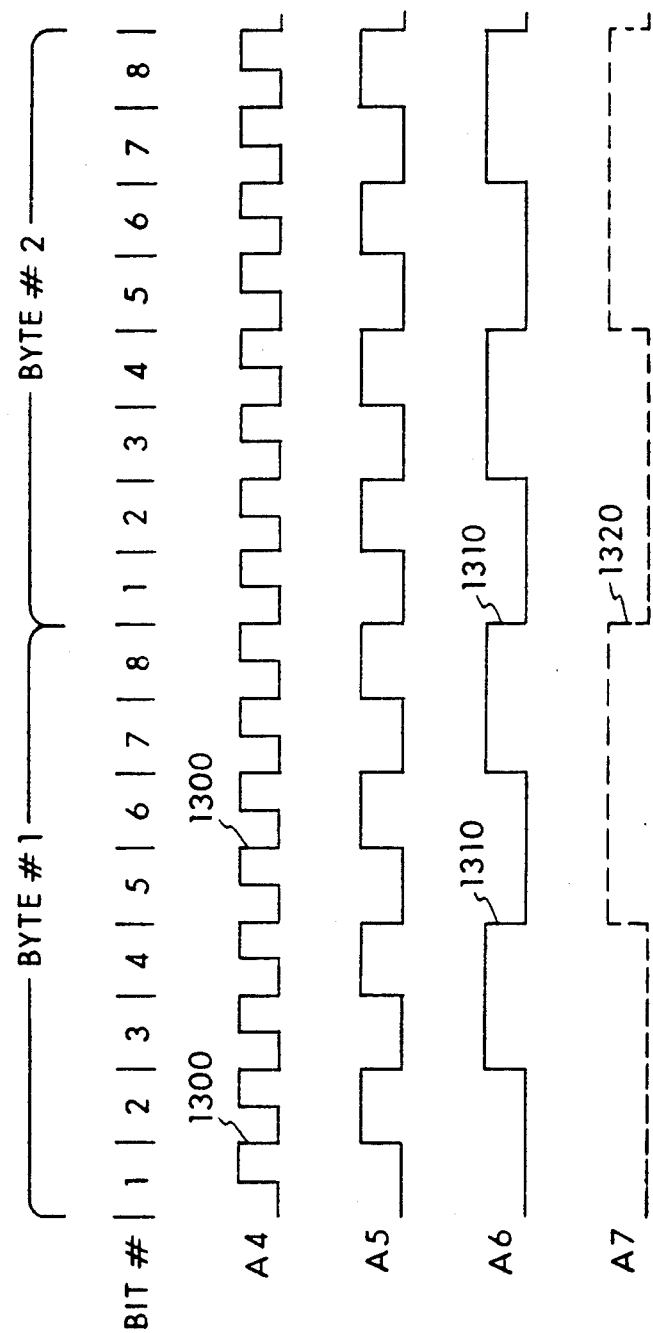
FIG. 13 illustrates the digital bit clock, nibble clock, and byte clock generation for the despread digital information.

In FIG. 13, two bytes of digital data are shown (byte #1 and byte #2). Each byte is composed of eight bits 200. What is shown in FIG. 13 are the inputs A4 through A6 to sequence memory 1130. Any one of these four waveforms or any combination thereof could be delivered from the PRSG 320 to serve as timing for the despread digital information. Waveform A6 of FIG. 13 corresponds to timing for a nibble clock (i.e., 4 bits). The waveform A7 shown dotted would correspond to timing for a byte clock, if M=256. In which case, inputs $A_0$ to $A_7$ would be generated in the PRSG.

A goal in generating timing is the presence of the falling edge of the clock signal. For example, in the bit clock, A4 of FIG. 13, the falling edges 1300 provide the necessary bit clock timing and for each byte of despread digital information there are eight falling edges 1300. The nibble clock output A6 provides two falling edges 1310 per byte. The A7 output corresponding to the byte clock provides a single falling edge 1320 per byte. Without question, the read data word circuit 370 could optimally utilize the byte clock 1320 in that the byte clock provides a falling edge 1320 with the occurrence of every byte. Hence, in a time slot comprising 40 bytes, the byte clock becomes an important timing mechanism.

Under the teachings of the present invention, in order to generate the byte clock wherein a falling edge 1320 is generated every eight bits, the length of the sequence, M, would have to equal 256 chips. This length of the pseudo random sequence would double the acquisition time discussed above and therefore provides a high overhead. Under the teachings of the present invention, therefore, M is selected at 128 and bit clock timing and nibble clock timing is provided over lines 323 to the read data word circuit 370.

As clearly shown in FIGS. 6 and 12, the digital timing method of the present invention requires that the transmission of the digital bit boundaries are aligned on CB boundaries. The present invention provides a unique method and system for generating digital clock timing in a receiver for use in direct-sequence spread-spectrum digital communication systems wherein spread data is delivered from a transmitter to a receiver.

The transmitter utilizes direct-sequence spreading codes for spreading the digital bits in the time frame. The direct sequence spreading codes each have the same fixed sequence length of M chips and, furthermore, the number of chips per bit to spread each digital bit is constant and fully aligned with each digital bit. The ratio of M:CB is an integer and the ratio of time of each time slot to the time of the M chips also equals an integer. The spread frames of digital information are despread at the receiver with receiver provided identical direct-sequence codes. The digital clock timing is generated from the receiver's pseudo random sequence generator: bit timing equals CB, nibble timing equals 4 * CB2, and byte timing equals 8 * CB.

It is to be expressly understood that the claimed invention is not to be limited to the description of the preferred embodiment but encompasses other modifications and alterations within the scope and spirit of the inventive concept. For example, the system and method of generating digital clock timing from the PRSG is not limited to spreading of TDMA or TDD digital data segregated into time slots. Digital clock timing at the bit level is accurately and inexpensively recovered from the PRSG at the receiver.

It is to be expressly understood that the claimed invention is not to be limited to the description of the preferred embodiment but encompasses other modifications and alterations within the scope and spirit of the inventive concept. For example, the system and method of generating digital clock timing from the PRSG is not limited to spreading of TDMA or TDD digital data segregated into time slots. Digital clock timing at the bit level is quickly recovered from the PRSG at the receiver.

We claim:

1. A method of generating digital data clock timing in a receiver for spread-spectrum digital communication data between a transmitter and a receiver, said method comprising the steps of:
   (a) providing said digital communication data, said digital communication comprising individual digital bits,
   (b) providing a spreading code for spreading said digital bits, said spreading code having a predetermined chip length of M chips where $M = 2^n$ and n = integer and a predetermined number of chips per bit, CB, aligned to spread each said digital bit,
   (c) spreading at said transmitter said digital bits with the transmitter provided spreading code,
   (d) providing at said receiver an identical copy of said spreading code as provided at said transmitter,
   (e) despreading said spread digital bits with said receiver provided spreading code,
   (f) generating from the receiver provided spreading code digital data clock timing for said despread digital bits.

2. The method of claim 1 wherein the step of providing digital communication data further provides frames of digital communication data, each of said frames having a plurality of time slots, each of said time slots having a plurality of digital bits, $B_{ts}$.

3. The method of claim 2 wherein the step of providing a spreading code further aligns the predetermined number of chips per bit, CB, with each digital bit according to the following ratio:
   $M \div CB = $ integer.

4. The method of claim 3 wherein the step of providing a spreading code further aligns the predetermined time length of M chips with each time slot according to the following ratio:
   $(B_{ts} * CB) \div M = $ integer.

5. A method of generating digital data clock timing in a receiver for spread-spectrum digital communication data between a transmitter and said receiver, said method comprising the steps of:
   (a) providing frames of said digital communication data, each of said frames having a plurality of time slots, each of said time slots having a plurality of digital bits,
   (b) providing a plurality of spreading codes for spreading said digital bits, each spreading code being assigned to spread one of said time slots, each of said plurality of spreading codes having a predetermined chip length of M chips and a predetermined number of chips per bit, CB, aligned to spread each said digital bit,
   (c) spreading at said transmitter said digital bits in said time slots with the transmitter provided spreading codes,
   (d) providing at said receiver an identical copy of said plurality of spreading codes as provided at said transmitter,
   (e) despreading said spread digital bits in said time slots with said receiver provided spreading codes,
   (f) generating from the receiver provided spreading code digital data clock timing for said despread digital bits.

6. A method of generating digital bit clock timing in a receiver for direct-sequence spread-spectrum digital communication data between a transmitter and a receiver, said method comprising the steps of:
   (a) providing at said transmitter frames of said digital communication data, each of said frames having a plurality of time slots, each of said time slots having a plurality of digital bits, $B_{ts}$, (b) providing at said transmitter a plurality of direct-sequence spreading codes for spreading said digital bits, each direct-sequence spreading code being assigned to spread one or more of said time slots, each of said plurality of direct-sequence spreading codes having a predetermined chip length of M chips and a predetermined number of chips per bit, CB, aligned to spread each said digital bit, wherein the ratio of M:CB being an integer and wherein the ration $(B_{ts} * CB) \div M$ = integer, (c) spreading at said transmitter said digital bits in said time slots with the transmitter provided direct-sequence codes, (d) providing at said receiver an identical copy of said plurality of direct-sequence spreading codes as provided at said transmitter, (e) despreading at said receiver said spread digital bits in said time slots with said receiver provided direct-sequence codes, (f) generating from the receiver provided direct-sequence codes the bit timing for said despread digital bits wherein said bit time equals CB.

7. The method of generating digital data clock timing in a receiver for direct-sequence spread-spectrum digital communication data between a transmitter and a receiver, said method at said transmitter comprising the steps of:

(a) providing a plurality of frames of digital data, each of said frames having a predetermined number of time slots, each of said time slots having a plurality of digital bits, $B_{ts}$, (b) providing a direct-sequence spreading code for spreading the digital bits $B_{ts}$ in at least one time slot, said direct-sequence spreading code having a predetermined chip length of M chips where $M = 2^n$, n = integer and a predetermined number of chips per bit, CB, aligned with each said digital bit, the ratio of M:CB being an integer and wherein the ratio of $CB * B_{ts} \div M$ = integer, (c) spreading the digital bits in said at least one time slot with the transmitter provided direct-sequence code, (d) transmitting said plurality of frames containing said digital bits in said at least one time slot spread by said transmitter provided direct-sequence code, and said method at said receiver comprising the steps of:

(a1) receiving said transmitted plurality of frames, (b1) providing an identical copy of said direct-sequence spreading code as provided by said transmitter, (c1) despreading said transmitted digital bits of information in said at least one time slot with said receiver provided direct-sequence code, (d1) generating the digital clock timing from the receiver provided direct-sequence code.

8. The method of claim 7 wherein said step of generating said digital clock timing produces a byte clock having a period equal to the time of 8 * CB chips.

9. The method of claim 7 wherein said step of generating said digital clock timing produces a nibble clock having a period equal to the time of 4 * CB chips.

10. The method of claim 7 wherein said step of generating said digital clock timing produces a bit clock having a period equal to the time of CB chips.

11. A method of generating digital data clock timing in a receiver for direct-sequence spread-spectrum digital communication data between a transmitter and a receiver, said method at said transmitter comprising the steps of:

(a) providing at least one frame of digital communication data, said at least one frame having a plurality of time slots, each of said time slots having a plurality of digital bits, $B_{ts}$, (b) providing a plurality of direct-sequence spreading codes for spreading the digital bits in said plurality of time slots, each direct-sequence spreading code being assigned to spread one of said time slots, each of said plurality of direct-sequence spreading codes having a predetermined chip length of M chips where $M = 2^n$ and N = integer and a predetermined number of chips per bit, DB, aligned to spread each said digital bit, the ratio of M:CB is an integer and the ratio of $CB * B_{ts} \div M$ = integer, (c) spreading the digital bits in said time slots with the transmitter provided direct-sequence codes, (d) transmitting said at least one frame containing said spread digital bits, and said method at said receiver comprising the steps of:

(a1) receiving said at least one transmitted frame, (b1) providing an identical copy of said plurality of direct-sequence spreading codes as provided by said transmitter, (c1) despreading said transmitted digital bits in said time slots with said receiver provided direct-sequence codes, (d1) generating the digital clock timing from the receiver provided direct-sequence codes for said despread digital bits in said time slots by counting the number of chips.

12. The method of claim 11 wherein said step of generating said digital clock timing produces a byte clock having a period equal to the time of 8 * CB chips.

13. The method of claim 11 wherein said step of generating said digital clock timing produces a nibble clock having a period equal to the time of 4 * CB chips.

14. The method of claim 11 wherein said step of generating said digital clock timing produces a bit clock having a period equal to CB.

15. A system for generating digital timing for digital data in a spread-spectrum communication system, said system comprising:

means for spreading said digital data with a direct-sequence spreading code, said digital data having a plurality of digital bits, said direct-sequence spreading code having a predetermined chip length of M chips where $M = 2^n$ and n = integer, said direct sequence spreading code having a predetermined number of chips per bit, CB, aligned with each said digital bit, wherein the ratio M:CB is an integer, means for despreading said spread digital data from said spreading means with said direct-sequence spreading code, means connected to said despreading means for generating said digital timing for said despread digital data by counting the chips in the aforesaid spreading code.

16. A system for generating digital timing for a plurality of frames of digital data in a spread-spectrum communication system, said system comprising:

means for spreading said plurality of frames of digital data with a plurality of direct-sequence spreading codes, each of said frames having a predetermined number of time slots, each of said time slots having a plurality of digital bits, $B_{ts}$, each of said plurality of direct-sequence spreading codes being assigned to at least one of said time slots, each of said plurality of direct-sequence spreading code having a predetermined chip length of M chips with a predetermined number of chips per bit, CB, aligned with each said digital bit, wherein the ratio of M:CB is an integer and wherein the ratio of CB * $B_{ts} \div M$ is an integer.

means for despreading said spread plurality of frames of digital data with said plurality of direct-sequence spreading codes, means connected to said despreading means for generating said digital timing for said despread plurality of frames of digital data by counting a multiple of CB chips.

17. The system of claim 16 wherein said generated digital timing is bit timing and wherein said multiple of CB chips is one.

18. The system of claim 16 wherein said generated digital timing is nibble timing and wherein said multiple of CB chips is four.

19. The system of claim 16 wherein said generated digital timing is byte timing and wherein said multiple of CB chips is eight.

20. A system for generating digital timing for a plurality of frames of digital data in a spread-spectrum communication system, said system comprising:

means (10) for producing a plurality of frames of digital data, each of said frames having a predetermined number of time slots, each of said time slots having a plurality of digital bits, $B_{ts}$, means (20) for providing a plurality of direct-sequence spreading codes being assigned to at least one of said time slots, each of said plurality of direct-sequence spreading codes having a predetermined chip length of M chips where $M = 2^n$, n = integer with a predetermined number of chips per bit, CB, aligned with each said digital bit, wherein the ratio of M:CB is an integer and wherein the ratio CB * $B_{ts} \div M$ is an integer, means (10, 14) connected to said providing means for generating bit clock digital timing for said frame producing means, and further providing chip timing clock signals to the direct-sequence spreading providing means, means (30, 50) for spreading said plurality of frames of digital data with said plurality of direct-sequence spreading codes, means (340) for generating at least one multiple of said CB chip clock signal at said receiver, means (320) receptive of said chip clock signal from said generating means for despreading said spread plurality of frames of digital data with said plurality of direct-sequence spreading codes, means in said despreading means for generating the digital timing for said despread plurality of frames of individual data from said chip clock signal in each said sequence.

* * * * *